United States Patent
Yamazaki et al.

(10) Patent No.: US 7,079,216 B2
(45) Date of Patent: Jul. 18, 2006

(54) MANUFACTURING METHOD OF DISPLAY DEVICE IN WHICH THE MAIN SURFACE OF THE WORKPIECE IS AT AN ANGLE

(75) Inventors: Hisao Yamazaki, Mobara (JP); Mitsuru Igarashi, Mobara (JP)

(73) Assignee: Hitachi Displays., Ltd., Mobara (JP)

( * ) Notice: Subject to any disclaimer, the term of this patent is extended or adjusted under 35 U.S.C. 154(b) by 158 days.

(21) Appl. No.: 10/833,160

(22) Filed: Apr. 28, 2004

(65) Prior Publication Data

US 2004/0212774 A1     Oct. 28, 2004

(30) Foreign Application Priority Data

Apr. 28, 2003   (JP)  ................ 2003-124224
Dec. 25, 2003   (JP)  ................ 2003-429584

(51) Int. Cl.
    *G02F 1/1333*     (2006.01)
    *G02F 1/13*     (2006.01)

(52) U.S. Cl. ................... 349/158; 349/187

(58) Field of Classification Search ........... 349/158, 349/187

See application file for complete search history.

(56) References Cited

U.S. PATENT DOCUMENTS

| | | | |
|---|---|---|---|
| 6,236,446 B1 * | 5/2001 | Izumi et al. ........... | 349/187 |
| 6,741,320 B1 * | 5/2004 | Chae et al. ........... | 349/187 |
| 2004/0001177 A1 * | 1/2004 | Byun et al. ........... | 349/187 |
| 2004/0155085 A1 * | 8/2004 | Takamatsu et al. ...... | 225/2 |

* cited by examiner

*Primary Examiner*—Andrew Schechter
*Assistant Examiner*—Mike Qi
(74) *Attorney, Agent, or Firm*—Antonelli, Terry, Stout and Kraus, LLP.

(57) ABSTRACT

Stacked mother substrates are efficiently separated into individual display device substrate-units by a scribing and breaking method. In a state in which the transported stacked mother substrates PN are held in a raised state, scribe lines SBL1, SBL2 are formed on a first substrate SUB1 and a second substrate SUB2 at the same position. Then, first of all, the stacked mother substrates are broken into strip-like substrates by breaking a periphery and removing a peripheral wastage and, thereafter, the strip-like substrates are broken into display device substrate-units PNL and, thereafter, internal wastages of the respective display device substrate-units PN are separated and removed.

5 Claims, 18 Drawing Sheets

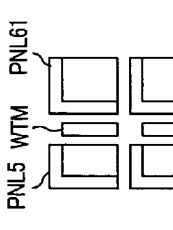
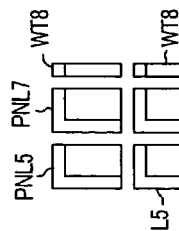
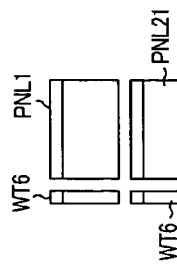
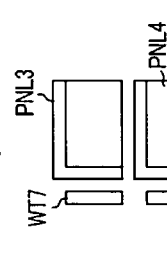
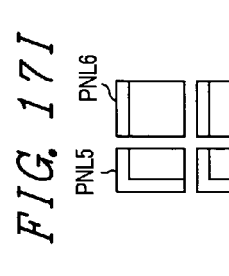
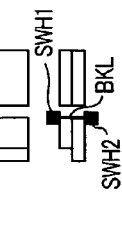
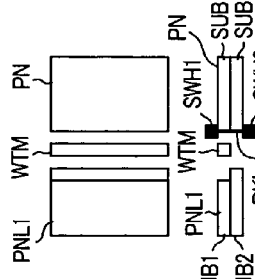
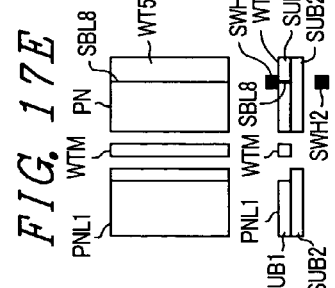
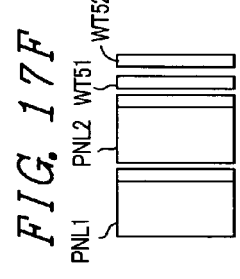
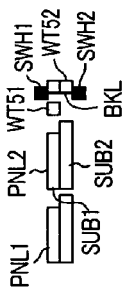
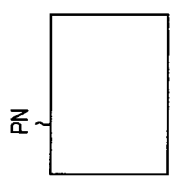
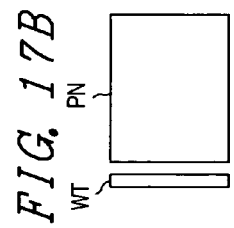

MANUFACTURING METHOD OF DISPLAY DEVICE IN WHICH THE MAIN SURFACE OF THE WORKPIECE IS AT AN ANGLE

BACKGROUND OF THE INVENTION

The present invention relates to a method of manufacture and a device for the manufacture of a display device in which individual display device substrate-units are separated from stacked mother substrates.

A planar panel type display device is constituted such that two sheets of large-sized substrates (referred to as stacked mother substrates hereinafter), formed of a first substrate (in general, a glass substrate, simply referred to as a substrate) and a second substrate which are laminated to each other while incorporating pixel regions of a plurality of unit display devices, are separated into individual display device substrate-units, and drive circuits are incorporated into terminals pulled out from the pixel regions. To separate the workpiece into individual display device substrate-units, for example, as described in JP-A-6-48755 (literature 1), scribe lines are formed on the first substrate, and, after turning the stacked mother substrates up side down, the stacked mother substrates are broken along the scribe lines. Next, scribe lines are formed on the second substrate and the stacked mother substrates are again turned up side down and are broken along the scribe lines. Thereafter, peripheral portions for exposing terminal portions are removed as wastage.

In this breaking operation, a so-called scribing and breaking method is adopted. In this method, the stacked mother substrates PN on which the scribe lines are formed are mounted on a break table which has a metal plate, such as a stainless-steel plate, mounted on a cushion sheet made of rubber, sponge or the like in a state such that the scribe lines along which the substrates are to be broken are set at the break table side, and, thereafter, the stacked mother substrates are broken by being hit by a breaking bar made of a rubber member or the like from a side opposite to the scribe lines along the scribe lines or by having a pushing force applied thereto.

Further, JP-A-6-3633 (literature 2) discloses a scribing and breaking method in which respective stacked glass substrates are clamped using a pair of clamps while sandwiching the scribe line and the stacked glass substrates are broken by rotating one clamp at the scribe line.

FIG. 19 is a diagram showing a working example of the use of scribing lines in a conventional scribing and breaking method. Here, an example in which 9 display device substrate-units are obtained from the stacked mother substrates formed of two substrates SUB1 and SUB2 is shown. On a surface of the first substrate SUB1 (front surface of stacked mother substrates in FIG. 22), eight scribe lines SBL1 in total consisting of four scribe lines in the X direction and four scribe lines in the Y direction are formed. With respect to the scribe lines SBL2 which are formed on the surface of the second substrate SUB2 (back surface of the stacked mother substrates), in addition to eight scribe lines SBL2 which are formed at the same positions as the scribe lines SBL1 formed on the first substrate SUB1, four additional scribe lines SBL2 are formed. Accordingly, twenty scribe lines in total become necessary at front and back surfaces of the stacked mother substrates.

That is, in the periphery of the stacked mother substrates, the scribe lines are formed at the same positions on the front and back surfaces of the first and second substrates and portions which are separated along the scribe lines become the wastage. Further, with respect to the scribe lines which are formed inside the stacked mother substrates, there exist scribe lines which are formed at the same positions at the front and back surfaces and scribe lines SBL2 which are formed at different positions from the scribe lines SBL1 only with respect to the second substrate SUB2. The substrate between the scribe line formed only in the second substrate SUB2 and the scribe line which agrees with the scribe line formed on the first substrate is removed as a wastage to expose terminal portions of the individual display device substrate-units.

FIGS. 20A to 20C are diagrams which show sequential steps in separating the stacked mother substrates on which the scribe lines are formed into display device substrate-units by breaking. FIG. 20A shows a state in which the stacked mother substrates PN, which have already been broken along the scribe lines SBL1 at the first substrate SUB1 side, are broken along the scribe lines SBL2 at the second substrate SUB2 side. The stacked mother substrates in which the first substrate SUB1 has been broken are placed on a break table BKT using a transfer device TFD. At this point of time, the scribe line SBL2 of the second substrate SUB2 to be broken is placed on the break table BKT side.

Next, as seen in FIG. 20B, the stacked mother substrates PN are hit from right above the scribe line SBL2 at the second substrate SUB2 side in an arrow direction P using a breaking bar, thus applying the pressure to cause breaking at a break end BK2.

As a result, the stacked mother substrates PN are separated into display device substrate-units PNL at the break end BK1 of the first substrate SUB1 and at the break end BK2 of the second substrate SUB2, as seen in FIG. 20C. Symbols WT1 and WT2 indicate undesired peripheral wastage and WTM indicates an internal wastage (also referred to as core-removed wastage) which constitutes an undesired wastage of a terminal exposed portion of each display device substrate-unit PNL.

BRIEF SUMMARY OF THE INVENTION

In the conventional scribing and breaking method, the formation and breaking of the scribe lines are all performed in a state in which the stacked mother substrates are horizontally placed on a scribe table and a break table. Accordingly, all of the step of forming the scribe lines on the first substrate and the second substrate which constitute the stacked mother substrates and the step of breaking the first substrate and the second substrate require steps of inverting or turning over the stacked mother substrates with respect to the scribe table and the break table. Accordingly, the stacked mother substrates have to pass through a plurality of complicated steps, and, hence, the frequency of occurrence of ruptures or cracks in the course of manufacture is increased. This has been a cause of reduced yield rate.

FIG. 21 is a diagram showing an example of how the substrates are separated, that is, by breaking of an internal wastage portion in FIG. 20 using a scribing and breaking method. As seen in the drawing, the break table BKT is constituted of a cushion material CSN and a metal plate MTL. When the stacked mother substrates PN are horizontally mounted on the metal material MTL of the break table BKT and breaking force is applied only to the second substrate SUB2 at the scribe lines SBL2 on the second substrate SUB2, there may be a case in which the first substrate SUB1 having no scribe lines is broken (indicated by a symbol NG1). This is attributed to the fact that the respective thicknesses of the first substrate SUB1 and the second substrate SUB2, which are included in the stacked mother substrates PN, are small, that is, 0.5 to 1.1 mm, and, hence, due to the application of pressure P, the cushion material CSN of the break table BKT locally sinks so that the stacked mother substrates PN are deflected.

FIG. 22 is a plan view showing one example of irregular breaking attributed to a conventional scribing and breaking method. When the breaking occurs at portions which project from the subscribe line due to causes similar to the causes explained in conjunction with FIG. 21, as indicated by a symbol NG2, an irregular shape is imparted to the second substrate in the display device substrate-unit PNL. As a result, a sufficient space cannot be ensured at a terminal exposing portion, and, hence, the stacked mother substrates PN becomes defective, thus lowering a yield rate.

FIGS. 23A to 23C are diagrams showing typical examples of the occurrence of flaws in the course of handling the substrates in the conventional scribing and breaking method. That is, at the time of performing inverting, transporting or mounting of the stacked mother substrates PN frequently with respect to the scribe table or the break table in the scribing and break forming steps, there arise notched separation residues shown in FIG. 23A to FIG. 23C. These residues also cause defective stacked mother substrates PN and give rise to lowering of the yield rate.

Further, conventionally, the stacked mother substrates on which scribe lines are formed are transported between surface tables (a subscribe table and a break table), or working is performed by inverting the substrates, and, hence, undesired cracks progress from the scribe lines at the time of forming the scribe lines or peeling off the substrates from the surface of the tables, thus giving rise to cracks in the substrate. FIGS. 24A to 24C are diagrams which show an example of the occurrence of substrate cracks in the stacked mother substrates on which the scribe lines are formed and the difficulty in removal of the inner wastage. At the time of handling the substrates, such as during transporting of the stacked mother substrates PN, scribe forming, peeling-off of the stacked mother substrates PN from the scribe table or the like, as shown in FIG. 24A, cracks NG3 occur from the scribe line SBL1. Accordingly, when the liquid crystal is preliminarily sealed in a plurality of respective display regions formed on the stacked mother substrates by a liquid crystal drop method, the liquid crystal leaks out from the space defined between two substrates constituting the stacked mother substrates, and this makes all of the display regions formed in the stacked mother substrates PN defective. Although FIG. 24A shows the surface of the first substrate SUB1, the same goes for the second substrate SUB2. The occurrence of such cracks becomes more remarkable as the size of the stacked mother substrates PN increases.

Further, the internal wastage WTM shown in FIG. 20C is broken and the internal wastage WTM is removed (core removed). At this point of time, since the neighboring scribe lines SBL2 at the internal wastage WTM portion in the second substrate SUB2, as shown in FIG. 24B are arranged close to each other, when one scribe line is broken, there arises a possibility that an undesired crack NG4 will be created also with respect to another scribe line. Further, even when the breaking is normally performed, as shown in FIG. 24C, the internal wastage WTM is in close contact with the first substrate SUB1 (identical as a mirror surface adhesion ADM), and, hence, the removal of the internal wastage WTM becomes difficult. Further, the greater the size of the stacked mother substrates PN, the more the internal wastage WTM is elongated, and, hence, the removal thereof becomes even more difficult.

It is an object of the present invention to overcome the above-mentioned various drawbacks of the related art and to provide a manufacturing method and a device for the manufacture of a display device for effectively separating the stacked mother substrates into respective display device substrate-units by a scribing and breaking method.

To achieve the above-mentioned object, the present invention introduces the following techniques in a method of manufacture of a display device, in which a workpiece (stacked mother substrates), including a pair of substrates which are laminated in an opposed manner and a plurality of display regions formed in a spaced-apart manner between the substrates, is broken for respective display regions, thus producing a plurality of display devices (display panels), each of which includes one of the plurality of display regions, by cutting, and a device for manufacture of a display device with which the workpiece for at least every other display region is broken and an extra portion from the workpiece is cut out as wastage.

Technique 1:
The above-mentioned workpiece is separated in a raised state in the direction of gravity.

Technique 2:
The above-mentioned pair of substrates which are included in the workpiece are respectively separated without inverting the workpiece.

Technique 3:
At least one of the above-mentioned pair of substrates included in the workpiece is broken by bending. The workpiece is bent with a main surface of the substrate to be broken being disposed outside (the main surface of the substrate to be separated being warped upwardly) in a state such that the pair of substrates are overlapped relative to each other. When the workpiece is broken for at least every other one of the display regions (every other arbitrary number of display regions) among a plurality of display regions formed in the workpiece, the workpiece is bent such that the above-mentioned pair of respective substrates are bent in directions different from each other for the respective substrates to be separated.

Technique 4:
At least one of a pair of substrates included in the workpiece is broken by the formation of scribe lines (grooves) on the main surface, and breaking (separation) of the substrate due to cleaving of the scribe lines is carried out. When the respective substrates are separated, after the formation of the scribe lines on one substrate, the formation of the scribe lines on the other substrate and the breaking of the other substrate along the scribe lines are performed, and, hence, there is no possibility that the step of forming the scribe lines to the substrate is repeated while skipping the step of breaking the substrate.

Although the above-mentioned technical drawbacks which arise with respect to the conventional manufacturing method of a display device can be suppressed even when only one of these techniques is adopted in the method of manufacture of a display device, the advantageous effect is enhanced by each combination thereof.

In the manufacturing method and the device for manufacture of a display device according to the present invention, the workpiece exhibits a shape which is obtained through a so-called pre-stage step of the manufacture of the display device. The workpiece includes a pair of substrates which are laminated to each other in an opposed manner, and a plurality of display regions are formed between the substrates. In many cases, the pair of respective substrates are directly used in the form of a glass substrate referred to as a mother glass, for example, without separating the glass. Further, with respect to the workpiece, due to the manufacturing method and the manufacturing device employed according to the present invention, eventually, the plurality of display regions which are formed between the pair of substrates can be separated individually one after another. Accordingly, it is possible to cut out a plurality of display devices (display panels) from the workpiece. In view of such circumstances, the above-mentioned workpiece is also referred to as "stacked mother substrates".

In the process of cutting out the plurality of display devices from the stacked mother substrates, at least one of a pair of substrates which constitute the stacked mother substrates is broken by the scribing step and the breaking step corresponding to one substrate and undesired portions are removed as wastage. The scribing step is a step in which a groove referred to as a scribe line is marked off on a main surface of the substrate to be broken and the scribe line determines the breaking position of the substrate. The breaking step is a process step in which the groove which constitutes the scribe line formed on the substrate is cleaved in the thickness direction of the substrate, and the substrate is broken using the scribe lines as a boundary. The device for manufacture of the display device according to the present invention is embodied as a scribing and breaking device which performs a scribing step and a breaking step. However, the device for manufacture of the display device may be also embodied as the combination of a scribe device which performs the scribing step and a breaking device which performs the breaking step.

In a pre-stage step of a manufacture of the display device, the pair of substrates which constitute the stacked mother substrates have the respective main surfaces thereof laminated to each other in a state such that the main surfaces are arranged orthogonal to the direction of gravity. Accordingly, the stacked mother substrates are transported to the scribing and breaking device in a state in which the main surfaces are held in a substantially horizontal state. In accordance with the above-mentioned technique 1, the stacked mother substrates are raised in such a manner that they move in the direction of gravity and the above-mentioned scribing step is applied to the stacked mother substrates.

At the time of cutting out at least one display region of the plurality of display regions which are formed on the stacked mother substrate from the stacked mother substrate, the step of respectively breaking the pair of substrates included in the stacked mother substrates is performed without inverting the stacked mother substrates in accordance with the above-mentioned technique 2. Accordingly, the arrangement of the pair of substrates in the stacked mother substrates before the scribing step is maintained without replacement until the breaking step is finished.

In the step of breaking at least one of the above-mentioned substrates which are included in the stacked mother substrates, in accordance with the above-mentioned technique 3, by clamping the stacked mother substrates at both sides of the scribe line which is formed on one of the substrates included in the stacked mother substrates and by bending one side of the stacked mother substrate as viewed from the scribe line with respect to the other side of the stacked mother substrate, one substrate is cleaved in the thickness direction from the scribe line (or main surface on which the scribe line is formed).

In the step which breaks the pair of respective substrates included in the stacked mother substrates, in accordance with the above-mentioned technique 4, the scribing step and the breaking step which cleaves the substrate on which the scribe lines are formed are performed continuously for every substrate.

The above-mentioned scribing step and breaking step of the stacked mother substrates are also applicable to a step of separating and throwing away undesired portions which exist in the periphery of the stacked mother substrates and in the periphery of the broken stacked mother substrates as a wastage. Further, the above-mentioned scribing step and breaking step of the stacked mother substrates are also applicable to a step of separating strip-like stacked mother substrates (sub stacked mother substrates), including M pieces (M being a natural number and smaller than N) of display regions from the stacked mother substrates on which N pieces (N being a natural number greater than 1) of display regions are formed. When the sub stacked mother substrates include a plurality of display regions, the above-mentioned scribing step and breaking step applied to the stacked mother substrates are also applicable to a step of separating individual display device substrate-units (including portions which constitute wastage) for every display region. Further, the above-mentioned scribing step and breaking step applied to the stacked mother substrates are also applicable to a step of separating undesired portions as wastage from at least one of the above-mentioned pair of substrates included in the display device substrate-unit.

The method of manufacture of a display device according to the present invention can be defined in relation to at least one of the above-mentioned techniques 1 to 4. A representative example of the method is defined as a series of steps as described hereinafter.

A step of raising stacked mother substrates, in which stacked mother substrates, including a first substrate and a second substrate, which are laminated to each other in an opposingly facing manner and have at least one display region formed between the first and the second substrates, is performed such that the angle which a main surface of the stacked mother substrates (also a main surface of the first substrate or the second substrate) makes with respect to the direction of gravity is decreased.

A first scribing step is carried out in which a first scribe line is formed on the main surface of the first substrate.

A first breaking step is carried out in which the first substrate is broken along the first scribe line by bending the stacked mother substrates toward the second substrate side (by upwardly warping the main surface of the first substrate on which the first scribe lines are formed).

A second scribing step is performed in which a second scribe line is formed on the main surface of the second substrate.

Firstly, a second breaking step is carried out in which the second substrate is broken along the second scribe line by bending the stacked mother substrates toward the first substrate side (by upwardly warping the main surface of the second substrate on which the second scribe lines are formed) are sequentially performed in this order, and a portion of the stacked mother substrates where at least one display region is formed and another portion close to the portion are separated from each other.

In the method of manufacture of a display device as defined in this manner, another portion close to the portion of the stacked mother substrates where at least one display region is formed is thrown away as wastage, for example. Further, with respect to the stacked mother substrates having a plurality of display regions formed between the first substrate and the second substrate, for example, due to the above-mentioned series of steps, at least one display region is separated from the remaining display regions. The plurality of display regions which are formed between the first substrate and the second substrate are arranged in a two-dimensionally spaced apart manner within the main surface of the stacked mother substrate (main surface of the first substrate or the second substrate). In other words, in the stacked mother substrates which are formed by this manufacturing method, one display region and at least one of another display region other than the display region and the extra region, which are expected to become a wastage, are arranged two-dimensionally within the main surface. When three or more rows of the plurality of display regions are arranged within the main surface of the stacked mother substrates or when the extra region and the plurality of display regions are arranged in parallel, following the second breaking step, a series of steps consisting of the first scribing step, the first breaking step, the second scribing step and the second breaking step are repeated, or a series of steps in which the flow is partially changed and consists of the second scribing step, the second breaking step, the first scribing step and the first breaking step, is added.

On a portion of the stacked mother substrates which is divided by the above-mentioned series of steps, at least a display region and the terminal region close to the display region are arranged within the main surface thereof. The portion of the stacked mother substrates includes a pair of substrates which are laminated to each other in an opposed manner in the same manner as the stacked mother substrates. Further, the terminal region, in the stacked mother substrates before being divided, is formed in a region where at least one display region and another display region or an extra region which becomes a wastage are spaced apart from each other, and terminals and wiring which supply signals and electricity to at least one display region are formed as the region formed in one of the pair of substrates. Accordingly, to complete the display device (display panel) which is provided with the display region, it is necessary to remove the other substrate (covering the terminal region) which opposingly faces the main surface of the one substrate on which the terminals and the wiring are formed. That is, in the display device which includes the pair of substrates laminated in an opposing manner, the terminal region which is formed on one substrate projects from another substrate and is used for connection with an external circuit of the display device.

The portion which includes the display region cut out from the stacked mother substrate and the terminal region corresponding to the display region (the portion which is formed on the display device as mentioned above) and assumes the state in which the terminal region is covered with the substrate included in the stacked mother substrates, is also referred to as a "display device substrate-unit" in this specification.

One representative example of the method of manufacture of the display device according to the present invention which exposes the above-mentioned terminal region by removing the undesired portion of the pair of substrates included in the display device substrate-unit from the display device substrate-unit as wastage is defined as a series of steps hereinafter.

That is, the method of manufacture of a display device includes:

a step of preparing a display device substrate-unit which includes a first substrate and a second substrate which are laminated to each other in an opposing manner, a display region which is formed between these substrates, and electrodes which supply signal or electricity to the display region formed on a second-substrate-side main surface of the first substrate, and further includes a terminal region arranged close to the display region, wherein the electrodes are covered with the second substrate;

a step which clamps the display device substrate-unit at the display region and the terminal region, respectively;

a step which forms a scribe line on a portion of a main surface of the second substrate corresponding to a boundary between the display region and the terminal region;

a step which breaks the second substrate along the scribe line by bending the display device substrate-unit toward the first substrate side (by warping a main surface of the second substrate on which the scribe lines are formed upwardly); and a step which pushes the terminal-region-side portion of the second substrate which is broken along the scribe line toward the first substrate side at one side opposite to the display region so as to peel off the terminal-region-side portion of the second substrate from the first substrate and the display-region-side portion of the second substrate (step which removes the terminal-region-side portion of the second substrate as wastage), wherein the electrodes formed on the terminal region are exposed.

When the terminal region is formed on end portions of the first substrate along two sides arranged close to each other, after the step of peeling off the terminal-region-side portion of the second substrate, the display device substrate-unit is rotated within a main surface of the display device substrate-unit (a main surface of the first substrate or the second substrate) and, thereafter, a series of steps ranging from the step which clamps the display device substrate-unit at the display region and the terminal region, respectively, to the step which peels off the terminal-region-side portion of the second substrate are repeated.

Further, in place of the above-mentioned steps ranging from the division of the stacked mother substrates to the removal of the wastage from the display device substrate-unit, the display device may be cut out from the stacked mother substrates by a series of steps as described below.

A step of raising stacked mother substrates is performed by slightly inclining the stacked mother substrates which is introduced horizontally with respect to the vertical direction.

A first scribing step is carried out in which a plurality of scribe lines which extend in the first direction and in the second direction crossing the first direction on a surface of the first substrate included in the stacked mother substrates corresponding to respective boundaries of the wastage portions and a plurality of display device substrate-unit portions arranged in parallel within a main surface of the stacked mother substrates.

A second scribing step is performed in which a plurality of second scribe lines which respective opposingly face the plurality of first scribe lines are formed on a surface of the second substrate which is included in the stacked mother substrates and opposingly faces the first substrate.

A first breaking step is carried out in which the stacked mother substrates are broken along the first scribe lines and the second scribe lines close to the wastage out of the plurality of first scribe lines and the plurality of second scribe lines, and the wastage portion is separated from the stacked mother substrate on which the plurality of display device substrate-unit portions are formed;

A second breaking step is carried out in which the stacked mother substrates from which the wastage portion is cut out are broken along the first scribe line and the second scribe line which extend in the first direction out of the first scribe lines and the second scribe lines, respectively; and, one of the plurality of display device substrate-unit portions and another display device substrate-unit portion, which is arranged close to the one display device substrate-unit portion, are separated along the second direction, whereby the stacked mother substrates are separated into strip-like stacked substrates which include at least one of the plurality of display device substrate-unit portions and extend in the first direction.

A third breaking step is performed in which the strip-like stacked substrates are broken along the first scribe line and the second scribe line which extend in the second direction out of the first scribe lines and the second scribe lines, and the display device substrate-unit portions formed on the strip-like stacked substrates are cut out.

A third scribing step is performed in which, on an end portion of a main surface of one of the first substrate and the second substrate included in the separated display device substrate-unit portions, a third scribe line and the fourth scribe line are respectively formed along two neighboring sides.

A fourth breaking step is carried out in which one of the first substrate and the second substrate is broken along the third scribe lines, and a periphery of the broken substrate which is arranged along one of two sides is separated as wastage.

A fifth breaking step is carried out in which one of the first substrate and the second substrate is broken along a fourth scribe line, and a periphery of the broken substrate which is arranged along another of two sides is separated as wastage.

The above-described steps are sequentially performed while maintaining the stacked mother substrates in a raised state, the strip-like stacked substrates and the display device substrate-units in a raised state respectively.

On the other hand, the device for manufacture of a display device (a display panel) according to the present invention, which employs the above-mentioned method of division of the stacked mother substrates described above, includes:

a transport mechanism which transports a workpiece which has two main surfaces extending in a first direction and in a second direction which intersects the first direction;

a first holding mechanism, which includes a pair of jigs which are respectively brought into contact with two main surfaces of the workpiece, that clamps the workpiece with the pair of jigs;

a second holding mechanism, which is arranged parallel to the first holding mechanism along the first direction and includes a pair of jigs which are respectively brought into contact with two main surfaces of the workpiece, that clamps the workpiece with the pair of jigs; and a scribe mechanism which moves along a third direction which intersects the first direction and the second direction between the first holding mechanism and the second holding mechanism and forms scribe lines on either one of two main surfaces of the workpiece.

The pair of respective jigs which are provided to the first holding mechanism and the second holding mechanism respectively conduct translational motions on a plane which spreads in the first direction and the third direction, and the respective jigs which are provided to at least one of the first holding mechanism and the second holding mechanism perform rotational motions on a plane which extends in the first direction and the third direction.

Further, another manufacturing device includes, in addition to the above-mentioned constitution of the manufacturing device, a press mechanism, which is arranged to opposingly face the scribe mechanism while the workpiece is clamped between the first holding mechanism and the second holding mechanism, moves along the third direction, which intersects the first direction and the second direction, and pushes the scribe lines formed on one main surface of the workpiece from another main surface side so as to promote cleaving of the scribe lines.

In these manufacturing devices, due to the rotational motion of the pair of jigs provided to at least one of the first holding mechanism and the second holding mechanism within a plan which extends in the first direction and the third direction, that is, within a plane which intersects the main surface of the workpiece and extends along the transport direction of the workpiece, the scribed workpiece (or a portion thereof) is broken at a site. The jigs may be formed in a "bar" shape which extends in the second direction and is brought into contact with the main surface of the workpiece. The scribe mechanism includes mark-off needles or scribe wheels which move along the second direction, and these needles or scribe wheels may be arranged at both sides of the workpiece.

Further, using a rotary mechanism having a stage which holds or sucks one of main surfaces of the workpiece, the workpiece may be rotated within the plane which spreads along the first direction and the second direction (plane along the main surface of the workpiece). The rotation of the workpiece may be performed in a step-like manner for every given angle (for example 90°).

Further, in the device for manufacture of a display device according to the present invention which adopts the above-mentioned method for removing wastage from the display device substrate-units, at least one of the pair of jigs which are provided to at least one of the first holding mechanism and the second holding mechanism is made to properly select any one of a plurality of shafts which extend in the second direction and is made to perform a plural types of rotational motions corresponding to respective axes on a plane which extends in the first direction and in the third direction. Due to such a constitution, it is possible to easily separate the wastage generated in the break stage from the workpiece.

Due to the above-mentioned manufacturing method and the manufacturing device according to the present invention, the step of removing the undesired portion of the substrate which is generated in the inside of the stacked mother substrate (referred to as internal wastage or internal core wastage) becomes unnecessary. All wastages which are generated from the stacked mother substrates are shifted to the end portion (the periphery) of the workpiece by the step of scribing the workpiece (the above-mentioned stacked mother substrates or display device substrate-units) and the step of breaking the workpiece which follows the scribing step or the repetition of the pair of steps. Accordingly, even when an area of the main surface of the stacked mother substrates becomes large-sized, an increase in the size of the wastage generated from the stacked mother substrates is suppressed, and, hence, even when the width of the wastage is narrowed corresponding to the above-mentioned terminal region formed in the display device, there is no possibility that the wastage remains in the inside of the workpiece, such as occurs in the conventional internal or core wastage. Further, the breaking step is not performed after performing the scribing steps several times and the workpiece is cleaved sequentially along the scribe lines formed for every scribing step, and, hence, the possibility of rupture of the substrates in the step of cutting out the display device from the stacked mother substrate can be suppressed.

According to the present invention, the steps of cutting out the plurality of display devices from the stacked mother substrates are classified into a scribing step and a breaking step of cutting out the respective display device substrate-units corresponding to these display devices and the scribing step and the breaking step of removing the remaining undesired portions as wastage. Accordingly, there is no possibility that a large number of scribe lines are formed on the workpiece at a time, and, hence, the probability of occurrence of cracks in the workpiece attributed to the scribe lines can be suppressed. Accordingly, it is possible to manufacture the display device from the stacked mother substrates with high a yield rate.

BRIEF DESCRIPTION OF THE DRAWINGS

FIG. 14A and FIG. 14B are diagram showing operations in the device for manufacture of a display device according to the present invention, wherein FIG. 14A is a front view and FIG. 14B is a side view;

FIG. 16A and FIG. 16B are diagrams showing the device for manufacture of a display device according to the present invention, wherein FIG. 16A is a front view and FIG. 16B is a side view;

FIGS. 17A to 17K are diagrams showing a separation step of one example of a scribe roller separation method according to the present invention;

DETAILED DESCRIPTION OF THE INVENTION

Embodiments according to the present invention will be explained in detail in conjunction with the drawings.

Figure 1A:
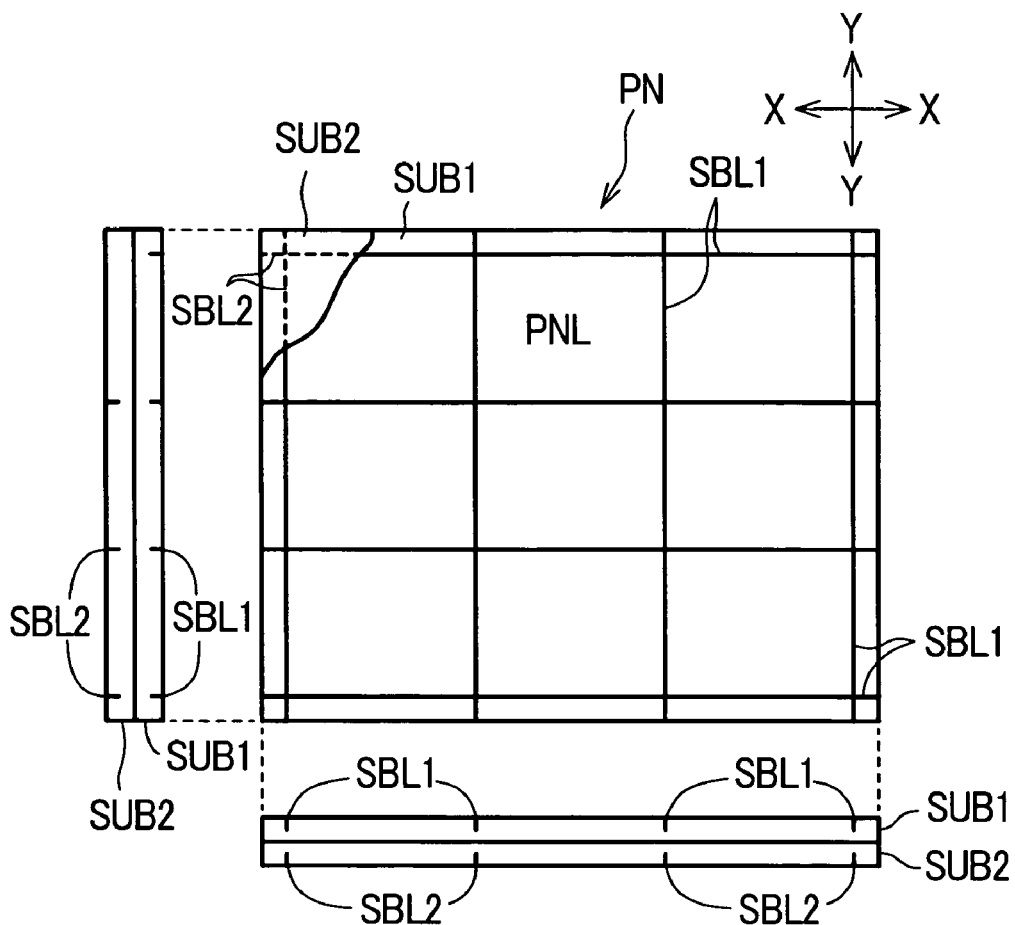
FIGS. 1A and 1B are diagrams showing an example of forming scribe lines according to the present invention.
Figure 1B:
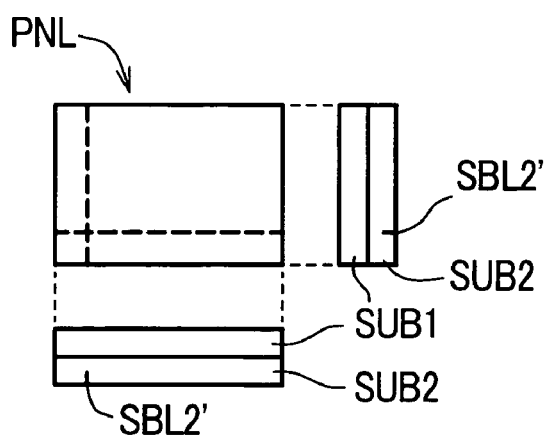

FIGS. 1A and 1B illustrate an example of how scribe lines are formed according to the present invention. In this embodiment, a method of manufacture according to the present invention is applied to a liquid crystal display device as an example. Stacked mother substrates PN, which will be described in more detail hereinafter, are formed by laminating a pair of substrates SUB1, SUB2 in such a way that they face each other in an opposed manner, and, between these substrates, a plurality of display regions are formed within a main surface. The plurality of these display regions are separated from each other by breaking these stacked mother substrates PN through a scribing step and a breaking step, which will be described hereinafter. Due to such operations, a plurality of display devices (display panels) which respectively constitute the above-mentioned display regions are obtained from the stacked mother substrates PN.

As an example of the stacked mother substrates in the manufacture of the liquid crystal display device, the plurality of respective display regions are formed as a plurality of spaces which are partitioned by a sealing material between a pair of substrates which constitute the stacked mother substrates. Further, as an example of the stacked mother substrates in the manufacture of a field emission type display device, the plurality of respective display regions are formed as a plurality of respective evacuated spaces which are partitioned by flit glass between the pair of substrates and are evacuated. In this manner, the operation to form the plurality of display regions between the pair of substrates and to laminate the pair of substrates while arranging them to face each other in an opposed manner is performed as a pre-step in the manufacture of the display device. Here, the method of manufacture of the liquid crystal display device according to this embodiment is also applicable to a one drop fill method in which liquid crystal composition is preliminarily dropped to a plurality of display regions (portions which are expected to become display regions) which are formed by surrounding regions with a sealing material on one of the pair of substrates before laminating the substrates in the pre-step, and, thereafter, the liquid crystal composition is sealed between the substrates for respective display regions by laminating the pair of substrates.

FIG. 1A shows one example of the stacked mother substrates which are to be broken into individual display devices (display panels PNL) by the manufacturing method according to this embodiment and one example of the arrangement of the plurality of display regions formed in the main surface, and FIG. 1B shows one display device PNL cut out from the stacked mother substrates PN shown in FIG. 1A.

With respect to the stacked mother substrates PN shown in FIG. 1A, in the above-mentioned pre-stage, a plurality of display regions (a plurality of electrode patterns corresponding to respective display regions) are formed on the main surface of one of two glass substrates SUB1, SUB2 prepared as mother glasses and these two glass substrates are laminated to each other by arranging a main surface of the other glass substrate to face this main surface in an opposed manner. As shown in side views along the x direction and the y direction of the stacked mother substrate PN shown in the lower side and the left side of FIG. 1A, two glass substrates SUB1, SUB2 which constitute the stacked mother substrate PN are laminated in a state in which these glass substrates SUB1, SUB2 have substantially an equal main surface area (including processing tolerance) and respective end portions are aligned with each other.

As an example of the stacked mother substrates PN shown in FIG. 1A, nine display regions are formed in a matrix array of three rows x three columns within the main surface. Each display region is formed as a region which is surrounded by a pair of scribe lines SBL1 which extend in the x direction and a pair of scribe lines SBL2 which extend in the y direction, which intersects the x direction among the scribe lines SBL1, SBL2 which are respectively formed on the main surfaces of the two substrates (glass substrates) SUB1, SUB2 which constitute the stacked mother substrates PN in the scribing step applied to the stacked mother substrates PN. The display regions PNL which are cut out as individual display panels are also referred to as display device substrate-units in the explanation provided hereinafter. Further, regions of end portion sides outside the scribe lines SBL1, SBL2 of the glass substrates SUB1, SUB2 are thrown away as wastage.

X-y coordinates in FIG. 1A indicate that the main surface of the stacked mother substrate PN is formed along a x-y plane. In this embodiment, the x-y plane extends such that the plane intersects the direction of gravity. At a stage in which the stacked mother substrate PN is completed by laminating the above-mentioned two substrates SUB1, SUB2 (stage that the pre-step is finished), the stacked mother substrates PN are arranged on a working table or are transported such that the main surface is formed along the x-y plane. A device for manufacture of the display device according to the present invention raises the main surface of the stacked mother substrates PN in such a state along the direction of gravity and, thereafter, performs the scribing step and the breaking step sequentially. In this embodiment, although the stacked mother substrates PN may be raised such that the main surface becomes parallel to the direction of gravity (in the vertical direction with respect to the above-mentioned x-y plane), it is preferable to incline the stacked mother substrates PN with a slight angle with respect to the direction of the gravity. In any case, the stacked mother substrates PN are raised such that the angle which the main surface makes with respect to the direction of gravity becomes smaller compared to a point of time in which the stacked mother substrates are assembled (at the time of finishing of the pre-stage) or at a point of time in which the stacked mother substrates are transported to the manufacturing device according to the present invention and, thereafter, scribes are applied to the main surface. Accordingly, in the manufacturing method of this embodiment, on the main surface of the stacked mother substrates PN, which lie within the x-y plane shown in FIG. 1A, the scribe lines SBL1, SBL2 which are shown in the drawing are not actually formed. In FIG. 1A, these scribe lines SBL1, SBL2 are indicated only for reference purpose to explain respective definitions described hereinafter.

The stacked mother substrates PN have the main surface thereof raised in the direction of gravity, as described above, and, thereafter, are inclined to the scribe table. In this state, the scribing step of the stacked mother substrates PN is started. On the main surface of the first substrate SUB1 which constitutes the stacked mother substrates PN (an outer surface which also constitutes one main surface of the stacked mother substrates PN at a side opposite to the second substrate SUB2), the scribe lines SBL1 are formed. The scribe lines SBL1 are formed as "grooves" on the main surface of the first substrate SUB1. Although these grooves extend toward the other main surface of the first substrate SUB1 which faces the second substrate SUB2 in an opposed manner, it is a rare case that these grooves reach the other main surface of the first substrate SUB1, and, hence, there is no possibility that the first substrate SUB1 is broken by these grooves (scribe lines SBL1). Also, in the main surface of the second substrate SUB2 which constitutes the stacked mother substrate PN (an outer surface which constitute another main surface of the stacked mother substrates PN at a side opposite to the first substrate SUB1), the scribe lines SBL2 are formed as "grooves" having a depth which can not break the second substrate SUB2. The "grooves" of the scribe lines SBL1 formed in the main surface of the first substrate SUB1 reach the other main surface of the first substrate SUB1 in the succeeding breaking step, and the first substrate SUB1 is broken at given positions (positions where the scribe lines SBL1 are formed). The "grooves" of the scribe lines SBL2 formed on the main surface of the second substrate SUB2 also reach the other main surface of the second substrate SUB2 in the succeeding breaking step, and, hence, the second substrate SUB2 is broken at given positions (positions where the scribe lines SBL2 are formed). The plurality of display device substrate-units PNL which are formed along the main surface of the stacked mother substrates PN are separated from other neighboring display device substrate-units PNL or the wastages by breaking the first substrate SUB1 in the breaking step which cleaves the scribe lines SBL1 and by breaking the second substrate SUB2 in the breaking step which cleaves the scribe lines SBL2.

On the stacked mother substrates PN shown FIG. 1A, the display device substrate-units PNL are formed such that three respective display device substrate-units PNL are arranged along the X direction (long side) in parallel and the Y direction (short side) in parallel, while a periphery (four sides) of the stacked mother substrates PN are thrown away as wastage. Accordingly, in the process for cutting out nine display device substrate-units PNL in total from the stacked mother substrates PN, in the first substrate SUB1, eight scribe lines SBL1 are formed of four scribe lines SBL1 which extend in the X direction and four scribe lines SBL1 which extend in the Y direction. Further, also in the second substrate SUB2, eight scribe lines SBL2 are formed of four scribe lines SBL2 which extend in the X direction and four scribe lines SBL2 which extend in the Y direction. However, in this embodiment, out of sixteen scribe lines SBL1, SBL2 in total shown in the drawing in this manner, eight scribe lines which extend either the X direction or the Y direction are sequentially formed on the first substrate SUB1 and the second substrate SUB2, these grooves are cleaved in the breaking step to break the stacked mother substrates PN into respective stacked mother substrates PN each of which includes three display device substrate-units PNL. Further, in this embodiment, the broken stacked mother substrates PN which are formed in the above-mentioned manner are rotated by 90° within the main surface, for example, and, thereafter, the eight remaining scribe lines SBL1, SBL2 which extend in either the Y direction or the X direction are sequentially formed on the broken stacked mother substrates PN and these grooves are cleaved in the breaking step, thus obtaining three display device substrate-units PNL.

The cut-out individual display device substrate-unit PNL is processed such that either one of the first substrate SUB1 and the second SUB2 which are contained in the cut-out individual display device substrate-unit PNL partially projects from the other substrate. On a portion of one substrate which projects from the other substrate, terminals which receive signals and power needed for driving the display device or integrated circuit elements which drive the display device upon receiving the signals and power are mounted. Accordingly, the portion of either one of the first substrate SUB1 and the second substrate SUB2 which projects from the other substrate is referred to as a terminal region, compared to a display region which is formed between these substrates. In this embodiment, the division of the stacked mother substrates PN and the cutout of display device substrate-units PNL from the broken stacked mother substrates are performed in a state in which the main surface of the first substrate SUB1 (or the second substrate SUB2) is raised in the direction of gravity, and, hence, the processing which makes one of the first substrate SUB1 and the second substrate SUB2 project from the other substrate on the display device substrate-unit PNL can be performed in substantially the same state. For example, the processing which separates, by cutting, the periphery along two sides of the second substrate SUB2 from the display device substrate-unit PNL shown in FIG. 1B and forms the peripheries of the first substrate SUB1 along two sides is performed in the following manner. First of all, one of two scribe lines SBL2' which are shown in FIG. 1B are formed on the main surface of the second substrate SUB2, the groove is cleaved in a breaking step thus cutting off one periphery of the second substrate SUB2 along two sides. Next, the display device substrate-unit PNL is rotated by 90°, for example, within the main surface of the first substrate SUB1 (or the second substrate SUB2). Finally, the other scribe lines SBL2' are formed on the main surface of the second substrate SUB2 and the grooves are cleaved in a breaking step thus separating by cutting a residual (another) portion of the periphery of the second substrate SUB2 along two sides.

In this manner, the scribe lines which extend in the first direction are formed on the main surface of the stacked mother substrates PN, and, thereafter, without forming the scribe lines which extend in the second direction which crosses the first direction, the stacked mother substrates PN are broken in the breaking step in which the grooves formed by the scribe lines which extend in the first direction are sequentially cleaved. Accordingly, the application of a load to the stacked mother substrates PN attributed to the formation of a large number of scribe lines can be reduced. Further, by performing a series of steps for cutting out the display device substrate-units PNL from the stacked mother substrates PN in a state in which the main surface of the substrate which is included in the stacked mother substrates PN is raised in the direction of gravity, the occurrence of unpredicted cracks from the scribe lines induced by the weight of the substrate can be suppressed. Further, the fact that the series of the steps of this embodiment can be performed without turning over the stacked mother substrates PN (without changing the position of two laminated substrates) also becomes a factor to suppress the occurrence of cracks. Further, by removing by cutting extra portions of the display device (display panel) on the first substrate SUB1 (or the second substrate SUB2) in a state in which the stacked mother substrates PN are cut into the display device substrate-units PNL, the wastage (an internal wastage) which is produced by the separation of the extra portions can be easily removed from the display device.

Accordingly, as shown in FIG. 1B, compared to the conventional technique in which twenty scribed lines in total are formed on both surfaces of the stacked mother substrates PN and the individual display devices are cut out by applying pressure to the stacked mother substrates PN from both sides, according to the technique of this embodiment, it is possible to surely cut out a plurality of display device substrate-units (display regions) PNL formed on the stacked mother substrates PN as display devices.

The manufacturing method according to this embodiment will be explained more specifically with respect to the respective steps of division of the stacked mother substrates PN and the separation by cutting of the extra portions of the substrate from the display device substrate-units PNL in conjunction with FIGS. 2A to 2I and FIGS. 3A to 3E.

Embodiment 1

Figure 2A:
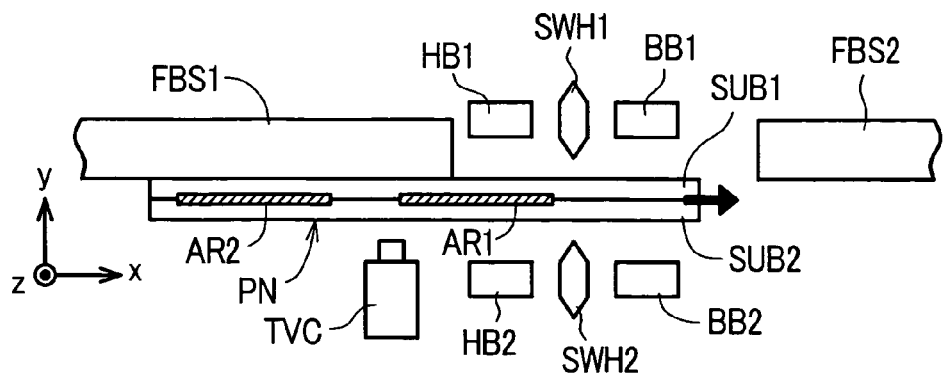
FIGS. 2A to 2I are diagrams which show the steps for separating display device substrate-units from stacked mother substrates in an embodiment 1 of a method of manufacture of a display device according to the present invention.

FIGS. 2A to 2I illustrate the breaking of the stacked mother substrates PN by showing a series of steps for separating, by cutting, the wastage from the periphery of the stacked mother substrates PN, as an example. FIG. 2A shows the device prepared for the step and also shows the stacked mother substrates PN which are transported to the device in a state in which the stacked mother substrates PN is raised in the direction of gravity. With respect to the stacked mother substrates PN shown in FIG. 2A, in a series of steps ranging from a step shown in FIG. 2B to a step shown in FIG. 2I, the wastage (peripheral wastage) is separated from an end portion (right end in FIG. 2A) of the stacked mother substrates PN.

The stacked mother substrates PN include the first substrate SUB1 and the second substrate SUB2 which are overlapped relative to each other and a plurality of display regions AR1, AR2 are formed therebetween. The respective display regions are constituted of spaces in which liquid crystal composition is filled. Alternatively, liquid crystal composition supplied according to a one drop fill method is sealed in the space. Further, around the respective display regions AR1, AR2, walls formed of sealing material are formed such that these walls surround the display regions AR1, AR2 whereby the first substrate SUB1 and the second substrate SUB2 are laminated to each other. Accordingly, the stacked mother substrates PN shown in FIG. 2A are depicted from the same viewpoint of any one of the side views of the stacked mother substrates PN shown in FIG. 1A. However, the stacked mother substrates PN shown in FIG. 2A are raised in the direction of gravity, and, hence, the main surface of the stacked mother substrates PN (the main surface of the first substrate SUB1 or the second substrate SUB2) is formed along the x-z plane of the coordinate axes shown in the drawing. The reason why the coordinate axes shown in FIG. 2A are described using small letters x, y, z compared to the coordinate axes shown in FIG. 1A, which is described using capital letters X, Y is that the z axis is slightly inclined in the direction of gravity. In this embodiment, although the z axis is inclined with respect to the direction of gravity within a range of 5 to 10°, the z axis may be inclined at an angle which is outside the range in response to the performance of the device shown in FIG. 2A.

The device shown in FIG. 2A includes surface tables FBS1, FBS2, a camera TVC which monitors the position of the stacked mother substrates PN, first holding members HB1, HB2 which sandwich the stacked mother substrates PN from both sides, scribe wheels SWH1, SWH2 which form the scribe lines on respective main surfaces of the stacked mother substrates PN, and second holding members BB1, BB2 which sandwich the stacked mother substrates PN from both sides at a side opposite to the scribe wheels SWH1, SWH2. Surfaces of the surface tables FBS1, FBS2 which face the first substrate SUB1 of the stacked mother substrates PN are inclined with an angle substantially equal to the above-mentioned z axis with respect to the direction of gravity and the main surface of the first substrate SUB1 which extends over the surfaces of the surface tables FBS1, FBS2 is slightly floated above the surface using air blown off from the surface. Although a belt conveyer which transports the stacked mother substrates PN in the bold arrow direction is arranged below the stacked mother substrates PN, the belt conveyer is omitted from FIG. 2A (the belt conveyer being explained in conjunction with the embodiment 3). Since the stacked mother substrates PN slightly float above the respective surfaces of the surface tables FBS1, FBS2, only the belt conveyer is brought into contact with the stacked mother substrates PN which are transported in the x direction. Here, the belt conveyer is interrupted between the surface tables FBS1, FBS2 on which the first holding members HB1, HB2, the scribe wheels SWH1, SWH2 and second holding members BB1, BB2 which are in charge of the scribing step and breaking step of the stacked mother substrates PN are arranged.

On the other hand, with respect to respective first holding members HB1, HB2 and respective second holding members BB1, BB2 having the rectangular shape shown in FIG. 2A, the sides thereof which face the first substrate SUB1 and the second substrate SUB2 extend in the z axis direction and form surfaces which are brought into contact with the main surfaces of the first substrate SUB1 and the second substrate SUB2. Accordingly, these holding members are formed in a "bar" shape which is elongated along a x-z plane. Further, in view of respective functional features, the first holding members HB1, HB2 are referred to as holding bars and are also referred to as the bending bars or breaking bars and the second holding members BB1, BB2 are referred to as bending bars or breaking bars. Further, as the scribe wheels SWH1, SWH2 which are arranged between the first holding members HB1, HB2 and the second holding members BB1, BB2, a known scribe wheel having a blade on a circumference thereof is used. With respect to a group of elements including the first holding member HB1, the scribe wheel SWH1 and the second holding member BB1 and a group of elements including the first holding member HB2, the scribe wheel SWH2 and the second holding member BB2, the first holding member, the scribe wheel and the second holding member of each group are assembled such that these parts can be freely movable while maintaining the layout relationship along the x axis. In this embodiment, the above-mentioned device shown in FIG. 2A is, in view of the functions thereof, referred to as a scribing and breaking device hereinafter.

As shown in FIG. 2A, with respect to the stacked mother substrates PN which are transported to the scribing and breaking device, as shown n FIG. 2B to FIG. 2I, the scribing step and the breaking step applied to the first substrate SUB1 and the scribing step and the breaking step applied to the second substrate SUB2 are sequentially performed.

Figure 2B:
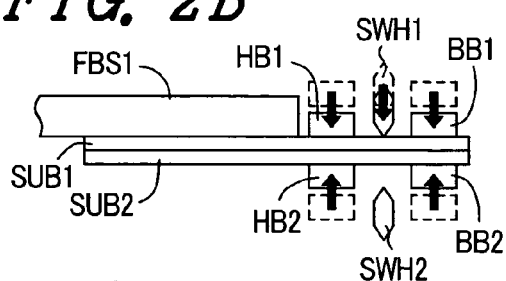

First of all, in the step shown in FIG. 2B, as soon as a camera TVC detects the insertion of portions of the stacked mother substrates PN to be cut into a working area of the scribing and breaking device, the above-mentioned belt conveyor is stopped so as to interrupt the transfer of the stacked mother substrates PN. Next, the first holding member (holding bar) HB1 and the second holding member (bending bar) BB1 are brought into pressure contact with the main surface (outer main surface) of the first substrate SUB1, while the second holding member HB2 and the second holding member BB2 are brought into pressure contact with the main surface (outer main surface) of the second substrate SUB2 so as to fix the position of the portions of the stacked mother substrates PN to be worked with respect to the scribe wheels SWH1. In this step, the scribe wheel SWH1 is arranged close to the main surface of the first substrate SUB1 along the y axis. When the scribe wheel SWH1 starts to move in the z axis direction while being brought into contact with the main surface of the first substrate SUB1, the blade which is formed in the circumference of the scribe wheel SWH1 is rotated to cut into the main surface of the first substrate SUB1. When a rotary shaft of the scribe wheel SWH1 is moved in the z axis direction in such a state, the scribe line (groove) which extends in the z axis direction is formed in the first substrate SUB1. Here, the first holding member, the scribe wheel and the second holding member which are indicated by a broken line in FIG. 2B represent respective positions in the immediately-before step (step shown in FIG. 2A with respect to step shown in FIG. 2B).

Figure 2F:
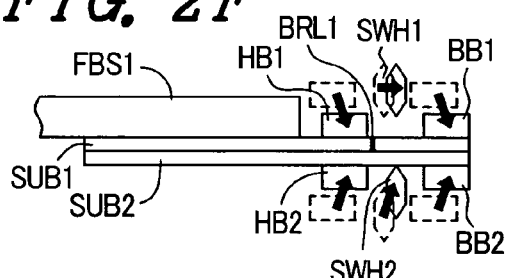
Figure 2C:
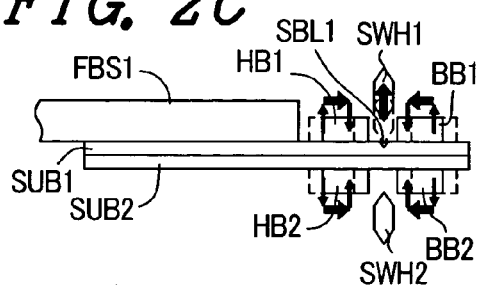

When the scribe line SWL1 which extends along the z axis direction is formed on the main surface of the first substrate SUB1 upon completion of the step shown in FIG. 2B, the step shown in FIG. 2C is started. In this step, the scribe wheel SWH1 is separated from the main surface of the first substrate SUB1 and, thereafter, the first holding member HB1 and the second holding member BB1 are shifted toward the scribe line SBL1 along the x direction. To prevent both of the first holding member HB1 and the second holding member BB1 from rubbing the main surface of the first substrate SUB1, the first holding member HB1 and the second holding member BB1 are first separated from the first substrate SUB1 and are moved along the x axis and, thereafter, are brought into pressure contact with the main surface of the first substrate SUB1. The first holding member HB2 and the second holding member BB2 at the second substrate SUB2 side are shifted toward the scribe line SBL1 in the same manner.

Figure 2G:
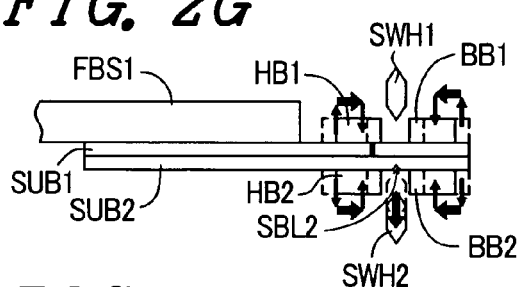
Figure 2D:
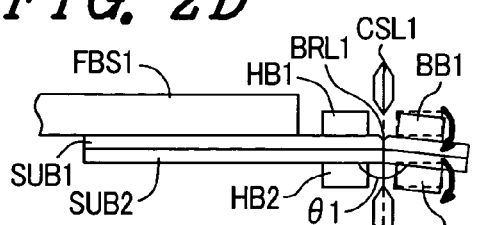

In the step shown in FIG. 2D, the second holding members BB1, BB2 which sandwich the stacked mother substrates PN are rotated in the x-y plane to warp the stacked mother substrates PN such that a side A and a side B which sandwich the scribe line SBL1 on the main surface at the second substrate SUB2 side assumes an angle θ1 which is less than 180°. Here, the first holding members HB1, HB2 are hardly moved as shown in the drawing. Accordingly, the stacked mother substrates PN are bent toward the side opposite to the main surface on which the scribe line SBL1 is formed and the main surface (at the first substrate SUB1 side) on which the scribe line SBL1 is formed assumes an angle which exceeds 180° at both sides of the center (indicated by a chain line CSL1) of the scribe line SBL1. In this manner, when the main surface of the first substrate SUB1 is warped at a portion where the scribe line SBL1 is formed, the groove which is formed in the first substrate SUB1 as the scribe line SBL1 is cleaved in the thickness direction of the first substrate SUB1, thus forming a break portion BRL1. Since the first substrate SUB1 is broken in the z axis direction while tracing a locus of the scribe line SBL1, the break portion BRL1 is also referred to as a break line.

Figure 2H:
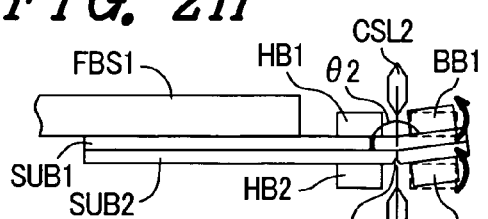
Figure 2E:
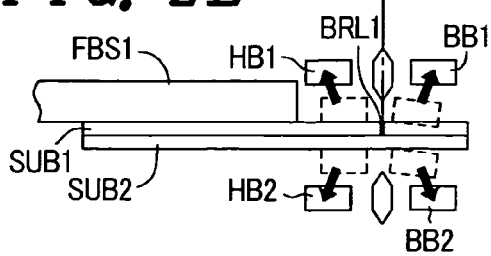

Upon completion of the scribing step and the breaking step of the first substrate SUB1 in the series of steps shown in FIG. 2B to FIG. 2D, the first holding members HB1, HB2 and the second holding members BB1, BB2 are separated from the stacked mother substrates PN as shown in FIG. 2E and return to the positions shown in FIG. 2A once together with the scribe wheels SWH1, SWH2.

Next, in the step shown in FIG. 2F, scribing of the second substrate SUB2 is started. When the second substrate SUB2 is cut at the same position as the first substrate SUB1, a series of steps ranging from the step shown in FIG. 2B to the step shown in FIG. 2D may be repeated by replacing the operation of the scribing wheel SWH1 in the step shown in FIG. 2B with the operation of the scribing wheel SWH2 and by upwardly warping the main surface of the second substrate SUB2 shown in FIG. 2D at the portion where the scribe line is formed. However, in this embodiment, the explanation is made with respect to a series of steps in which the second substrate SUB2 is cut at a position different from the position of the first substrate SUB1 and an end portion of the second substrate SUB2 projects from the first substrate SUB1.

In the step shown in FIG. 2F, in the same manner as the step shown in FIG. 2B, the first holding member HB1 and the second holding member BB1 are brought into pressure contact with the main surface of the first substrate SUB1, while the first holding member HB2 and the second holding member BB2 are brought into pressure contact with the main surface of the second substrate SUB2 so as to fix the position of the portions of the stacked mother substrates PN to be worked with respect to the scribe wheels SWH2. Since the portion to be worked is shifted in the x direction relative to the position explained in conjunction with the step shown in FIG. 2B, both of the portion of the stacked mother substrates PN which is sandwiched by the first holding members HB1, HB2 and the portion of the stacked mother substrates PN which is sandwiched by the second holding members BB1, BB2 are shifted in the x direction compared to corresponding portions in FIG. 2B. Subsequently, the scribe wheel SWH2 is made to approach the main surface of the second substrate SUB2 along the y axis while being rotated. When the scribe wheel SWH2 starts the marking-off of the main surface of the second substrate SUB2, the rotary shaft is moved in the z axis direction.

When the scribe line SBL2 which extends along the z axis direction is formed on the main surface of the second substrate SUB2 upon completion of the step shown in FIG. 2F, the step shown in FIG. 2G is started. In this step, the scribe wheel SWH2 is separated from the main surface of the second substrate SUB2 and, thereafter, the first holding member HB2 and the second holding member BB2 are shifted toward the scribe line SBL2 along the x axis. Further, the first holding member HB1 and the second holding member BB1, which are brought into pressure contact with the main surface of the first substrate SUB1, are also shifted toward the scribe line SBL2 in the same manner. In the same manner as FIG. 2C, to prevent both of the first holding member HB2 and the second holding member BB2 from rubbing the main surface of the second substrate SUB2 and, at the same time, to prevent both of the first holding member HB1 and the second holding member BB1 from rubbing the main surface of the first substrate SUB1, these holding members are first separated respectively from stacked mother substrates PN and are moved along the x axis direction.

However, in the step shown in FIG. 2G, it is necessary to consider the possibility that the break portion BRL1 which is already formed in the first substrate SUB1 gives rise to unpredicted flaws or cracks in the second substrate SUB2 in a breaking step of the second substrate SUB2 which comes next. In this embodiment, in the step shown in FIG. 2G, the first holding member HB1 is brought into pressure contact with the first substrate SUB1 at a position where the first holding member HB1 covers the break portion BRL1. Further, the first holding member HB2 is arranged to face the first holding member HB1 in an opposed manner and is brought into pressure contact with the main surface of the second substrate SUB2 so as to reinforce the strength of the portion of the first substrate SUB1 where the break portion BRL1 is formed from the second substrate SUB2 side.

Subsequently, in the step shown in FIG. 2H, the second holding members BB1, BB2 which sandwich the stacked mother substrates PN are rotated in the x-y plane to warp the stacked mother substrates PN such that a side A' and a side B' which sandwich the scribe line SBL1 on the main surface of the stacked mother substrates PN at the first substrate SUB1 side assumes an angle θ2 which is less than 180°. Also, in this step, in the same manner as the step shown in FIG. 2D, the first holding members HB1, HB2 are hardly moved, as shown in the drawing. Accordingly, the main surface of the second substrate SUB2 assumes an angle which exceeds 180° at both sides of the center (indicated by a chain line CSL2) of the scribe line SBL2. In this manner, when the main surface of the first substrate SUB2 is warped at a portion where the scribe line SBL2 is formed, the groove which is formed in the second substrate SUB2 as the scribe line SBL2 is cleaved in the thickness direction of the second substrate SUB2, thus forming a break portion BRL2. The break portion BRL2 is also used for breaking the second substrate SUB2 in the z axis direction while tracing a locus of the scribe line SBL2.

On the other hand, in the step shown in FIG. 2H in which the second substrate SUB2 bends toward the first substrate SUB1 side, there exists a possibility that an end portion (the side B . . . see FIG. 2E) which is broken at the breaking portion BRL1 will be pushed to the second substrate SUB2 and an end periphery of the first substrate SUB1 which faces the side A will rub against the main surface (inner main surface) of the second substrate SUB2 which faces the end periphery. However, in this embodiment, as shown in FIG. 2G, one (HB1) of the first holding members is brought into pressure contact with the break portion BRL1 on the main surface (outer main surface) of the first substrate SUB1 and the periphery thereof and the other (HB2) of the first holding members is brought into pressure contact with a region (on which the break portion BRL1 is projected) of the main surface (outer main surface) of the second substrate SUB2 which faces the break portion BRL1 and the periphery thereof. Accordingly, the movement of the end portion (side B) of the first substrate SUB1 which is caused by bending of the second substrate SUB2 can be suppressed. Accordingly, it is possible to suppress the possibility that the conductive film (electrodes and terminals) which is formed on the main surface (inner main surface in FIG. 2H) of the second substrate SUB2 in the pre-step of the stacked mother substrates PN or the insulation film which protects the conductive film is abraded and, hence, is damaged by the end portion of the first substrate SUB1.

Figure 2I:
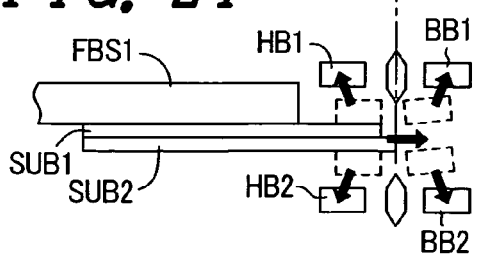

After completion of the step shown in FIG. 2H, when the first holding members HB1, HB2 and the second holding members BB1, BB2 are separated from the stacked mother substrates PN, in the step shown in FIG. 2I, the end portions of the first substrate SUB1 and the second substrate SUB2 which become wastage are automatically removed from an end portion of the stacked mother substrates PN (right end in FIG. 2A) of the stacked mother substrates PN. Accordingly, the wastage produced from the first substrate SUB1 and the second substrate SUB2 are smoothly discharged from the scribing and breaking device. On the other hand, in a series of steps shown in FIG. 2A to FIG. 2I, when so-called sub stacked mother substrates PN including M pieces (M being a natural number and N>M>1) of display device substrate-units PNL are separated from the stacked mother substrates PN on which N pieces of display device substrate-units PNL are formed, the broken sub stacked mother substrates PN are shown at the right side of FIG. 2H. Compared to the stacked mother substrates PN shown in FIG. 2H, the separated sub stacked mother substrates PN extend toward the right end of FIG. 2H along the x axis direction, and, hence, when the separated sub stacked mother substrates PN are separated by cutting from the body of the stacked mother substrates PN in the step shown in FIG. 2I, the separated sub stacked mother substrates PN are transferred in the x axis direction by a belt conveyor which is provided along the surface table FBS2.

The stacked mother substrates PN shown in FIG. 2I have a shape where a portion (the end portion) of the stacked mother substrates PN is separated by cutting as wastage or the sub stacked mother substrates PN. The stacked mother substrates PN are shifted along the x axis as indicated by an arrow such that portions of the first substrate SUB1 and the second substrate SUB2 to be cut next enter the work area of the scribing and breaking device and are again stopped at a desired position. When the portions to be cut are no longer present in the first substrate SUB1 and the second substrate SUB2 of the stacked mother substrates PN shown in FIG. 2I, the stacked mother substrates PN are transferred from the belt conveyor which is arranged along the surface table FBS1 to the belt conveyor which is arranged along the surface table FBS2.

The steps shown in FIG. 2A to FIG. 2I are, as these drawings show, performed in a state in which the main surface (of the first substrate SUB1 and the second substrate SUB2) of the stacked mother substrates PN is arranged along the x-z plane. In other words, the stacked mother substrates PN including the end portion to be cut maintains a state in which the stacked mother substrates PN are raised in the direction of gravity. Accordingly, the deflection of the stacked mother substrates PN due to their own weight can be suppressed whereby unpredicted substrate cracks which occur from the scribe lines or the like can be suppressed.

Further, the stacked mother substrates PN which are inserted into the work region of the scribing and breaking device in the step shown in FIG. 2A is not transported until the scribing step and the breaking step which are applied to the first substrate SUB1 and the second substrate SUB2, respectively, are finished (step shown in FIG. 2I). Accordingly, the positions of the first substrate SUB1 and the second substrate SUB2 in the scribing and breaking device are not changed during the period ranging from the step shown in FIG. 2A to the step shown in FIG. 2I except for the slight movement of respective end portions which are bent in the steps shown in FIG. 2D and FIG. 2H. Accordingly, the first substrate SUB1 is held at the same position from the point of time that the scribe line SBL1 is formed on the first substrate SUB1 to the point of time that the first substrate SUB1 is broken along the scribe line SBL1. Further, the second substrate SUB2 is also held at the same position from the point of time that the scribe line SBL2 is formed on the second substrate SUB2 to the point of time that the second substrate SUB2 is broken along the scribe line SBL2.

Accordingly, the rupture of the stacked mother substrates PN on which the scribe lines are formed during the transportation thereof can be obviated.

Further, during the period ranging from the step shown in FIG. 2A to the step shown in FIG. 2I, it is possible to apply the scribing step and the breaking step to the first substrate SUB1 and the second substrate SUB2 respectively without inverting the stacked mother substrate PN. In other words, the relationship in which the first substrate SUB1 faces the surface table FBS1 in an opposed manner at the point of time that the stacked mother substrates PN are transported to the scribing and breaking device is maintained until the scribing step and the breaking step which are applied to the first substrate SUB1 and the second substrate SUB2 are finished, and there is no possibility that the second substrate SUB2 faces the surface table FBS1 in place of the first substrate SUB1 in the midst thereof. Accordingly, it is possible to prevent the deflection of the main surfaces of the substrates attributed to gravity which is generated in the course of inverting the stacked mother substrates PN, and, hence, the concentration of stress on portions of the stacked mother substrates PN can be alleviated.

The reason why the scribing step and the breaking step of the stacked mother substrates PN can be performed without changing the position of the stacked mother substrates PN (in a so-called shift-free state) and without inverting the stacked mother substrates PN (in a so-called inversion-less state) in the above-mentioned manner lies in the breaking step which bends the stacked mother substrates PN on which the scribe lines are formed. It is preferable to perform this breaking step by bending the stacked mother substrates PN for every scribing step (for every scribe line).

In this embodiment, in breaking the stacked mother substrates PN into sub stacked mother substrates PN or the display device substrate-units PNL in a shift-free state and in an inversion free state, the movement of the above-mentioned first holding members and the above-mentioned second holding members which sandwich the stacked mother substrates PN at both sides of the position where the stacked mother substrates PN are broken play an important role. As can be clearly understood from the respective movements of the a first holding members (holding bars) HB1, HB2 and the second holding members (bending bars) BB1, BB2 shown in FIG. 2A to FIG. 2I, these first holding members and the second holding members move within the plane (the x-y plane in FIG. 2A) which intersects the main surface (the x-z plane in FIG. 2A) of the stacked mother substrates PN (or of the first substrate SUB1 and the second substrate SUB2 included in the stacked mother substrates PN) or are rotated about a normal line of the plane in response to the scribing step and the breaking step applied to the first substrate SUB1 and the second substrate SUB2 included in the stacked mother substrates PN. The plane on which the first holding members and the second holding members move around extends along the transfer direction (x axis) of the stacked mother substrates PN and preferably extends in parallel to the transporting direction of the stacked mother substrates PN. It is preferable that the plane is orthogonal to the main surface of the stacked mother substrates PN.

In the scribing and breaking device of this embodiment, due to the translational motion of the first holding members HB1, HB2 which are arranged at the transport side of the workpiece (stacked mother substrates PN) within the above-mentioned plane (x-y plane) and the translational motion and the rotational motion of the second holding members BB1, BB2 which are arranged at the delivery side of the workpiece within the above-mentioned plane (x-y plane), the respective substrates SUB1, SUB2 are broken (separated) by bending the stacked mother substrates PN and the substrates which are scribed for every scribing step are broken using the subscribe wheels SWH1, SWH2 which are arranged between the first holding members HB1, HB2 and the second holding members BB1 BB2. Here, the above-mentioned translational motion of the holding members indicates a so-called linear motion of the above-mentioned holding members and is exemplified as a motion which moves the rectangular holding members shown in FIG. 2A such that the four corners draw loci which are parallel to each other. Further, the above-mentioned rotational motion of the holding members is exemplified as a motion which inclines the respective other ends (the right side) of the second holding members BB1, BB2 shown in FIG. 2D and FIG. 2H in the y-axis direction with respect to respective ends (the left side) of the second holding members BB1, BB2 which are brought into contact with the substrates SUB1, SUB2 (the rotation of the second holding members about one end thereof.

The above-mentioned breaking step in which the stacked mother substrates PN are broken by bending can be also performed by a translational motion and a rotational motion of the first holding members HB1, HB2 within the above-mentioned plane (x-y plane) and a translational motion of the second holding members BB1, BB2 within the above-mentioned plane (x-y plane). Further, the translation motion and the rotational motion may be imparted to the first holding members HB1, HB2 and the second holding members BB1, BB2 within the above-mentioned plane (x-y plane of the scribing and breaking device).

The technique which juxtaposes the first holding members and the second holding members which sandwich the workpiece along the transporting direction of the workpiece in the scribing and breaking device and performs the breaking step of the workpiece by translational motion and rotational motion of the first holding members and the second holding members on the plane which intersects the main surface (working surface) of the workpiece and are arranged along the transporting direction of the workpiece is also applicable to a scribing and breaking device which transports the workpiece such that a main surface thereof is directed in a direction (horizontal direction) which is orthogonal to the direction of gravity and can obtain an advantageous effect in that the workpiece can be broken without deflecting the workpiece. In this case, the surface tables FBS1, FBS2 shown in FIG. 2A may be arranged such that respective surfaces thereof which face the stacked mother substrates PN (workpiece) in an opposed manner become orthogonal to the direction of gravity and the workpiece may be floated in response to compressed air blown off from the surfaces. Further, the scribe wheels may be arranged between the first holding members and the second holding members. Accordingly, the scribing and breaking device described in connection with this embodiment is applicable to other manufacturing devices which do not raise the workpiece (stacked mother substrates PN) as a component technique in the direction of gravity.

As described above, due to the scribing step and the breaking step of the stacked mother substrates PN which have been explained in conjunction with FIG. 2A to FIG. 2I, the stacked mother substrates PN shown in FIG. 1A are broken into sub stacked mother substrates, each of which includes three display device substrate-units PNL and the wastage in response to a group of scribe lines SBL1, SBL2 (four scribe lines SBL1 and four scribe lines SBL2), which extend either in the X direction or in the Y direction among four scribe lines SBL1 formed on the first substrate SUB1 and eight scribe lines SBL2 formed on the second substrate SUB2.

Further, the scribing step and the breaking step which have been described in conjunction with FIG. 2A to FIG. 2I are applicable to the step of cutting out the display device substrate-units PNL from the sub stacked mother substrates PN.

A series of steps in which the periphery of one of a pair of substrates which are included in the display device substrate-units PNL obtained in the above-mentioned manner is separated and the other substrate of the pair of substrates is projected from the one substrate will be explained in conjunction with FIG. 3A to FIG. 3E.

Figure 3A:
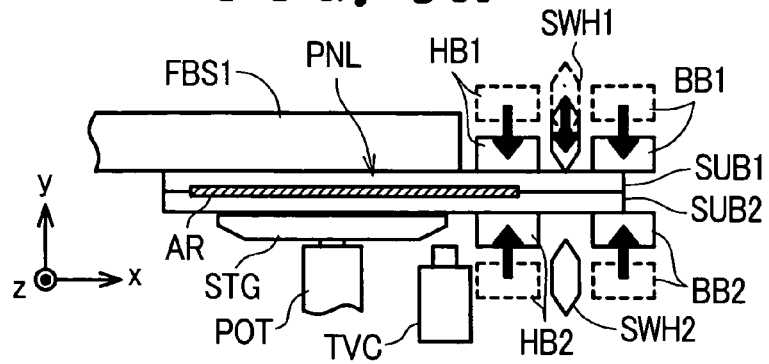
FIGS. 3A to 3E are diagrams which show steps for separating unnecessary portions (wastage) from the display device substrate-units of the embodiment 1 of the method of manufacture of the display device according to the present invention.
Figure 3B:
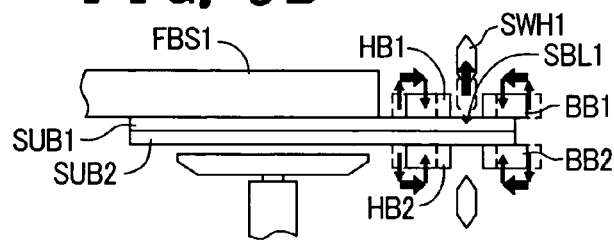

FIG. 3A shows the general configuration of one example of a scribing and breaking device used in the series of steps such that the scribe lines are formed on one (first substrate SUB1) of the pair of substrates which constitute the display device substrate-units PNL. Accordingly, the first holding members (holding bars) HB1, HB2 and the second holding members (holding bars) BB1, BB2 indicated by a solid line in FIG. 3A are respectively brought into pressure contact with the main surfaces of the first substrate SUB1 and the second substrate SUB2 in the same manner as FIG. 2B for preparing the formation of the scribe lines on the main surface of the first substrate SUB1 using the scribe wheel SWH1.

The respective structures and respective functions of the first holding members HB1, HB2, the scribe wheels SWH1, SWH2, the second holding members BB1, BB2, the surface tables FBS1 and the camera TVC which are provided to the scribing and breaking device are common with respective constitutional components shown in FIG. 2B. Further, a belt conveyor not shown in FIG. 3A is provided along the surface table FBS1 and a workpiece (display device substrate-units PNL) is transported along the x axis direction based on positional information on the workpiece obtained from the camera TVC. Further, the scribing and breaking device shown in FIG. 3A is provided with a substrate rotary machine ROT having a stage STG which comes into contact with one main surface of the workpiece (display device substrate-units PNL). The substrate rotary machine ROT imparts an air chuck function to the stage STG. In operation, the substrate rotary machine ROT causes the stage STG to suck the main surface of the workpiece and rotates the workpiece within the main surface (x-z plane defined by coordinates shown in FIG. 3A). This function is useful in an operation to separate the peripheries of the substrate SUB2 of the display device substrate-units PNL shown in FIG. 1B by cutting along the scribe lines SBL2' which are drawn along two neighboring sides respectively.

An operation to form the scribe lines on the main surface of the first substrate SUB1 in the step shown in FIG. 3A is performed in the same manner as the above-mentioned step shown in FIG. 2B. The operation in the step shown in FIG. 3B which follows the step shown in FIG. 3A, that is, the operation to maintain the workpiece (display device substrate-units PNL) while shifting the first holding members HB1, HB2 and the second holding members BB1, BB2 toward the scribe lines SBL1 is performed in the same manner as the step shown in FIG. 2C. Further, the step shown in FIG. 3C, that is, the step in which one second holding member BB1 is rotated in the clockwise direction about one end (left end) thereof which is brought into contact with the first substrate SUB1 and another second holding member BB2 is rotated in the clockwise direction about one end (left end) thereof which is brought into contact with the second substrate SUB2 so as to bend the workpiece (display device substrate-unit PNL) toward the second substrate SUB2 side, and the groove which is formed as the scribe line SBL1 in the first substrate SUB1 is cleaved at the center CSL thereof thus breaking the first substrate SUB1 is performed in the same manner as the above-mentioned step shown in FIG. 2D.

Figure 3C:
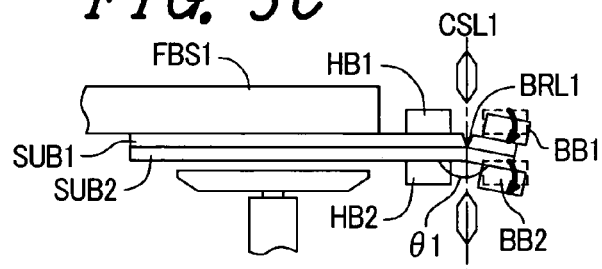
Figure 3D:
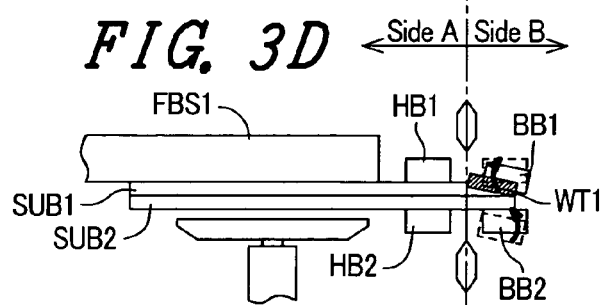
Figure 3E:
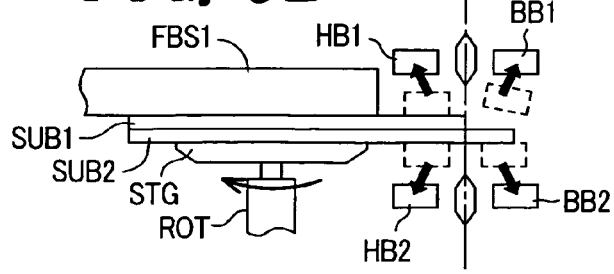
Figure 4A:
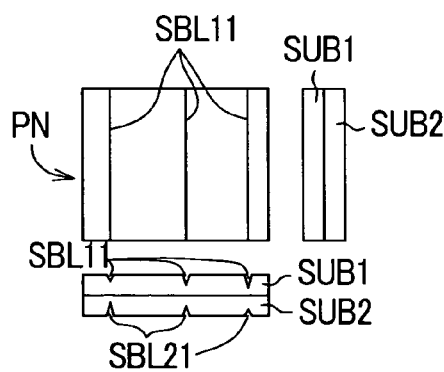
FIGS. 4A to 4G are diagrams which show steps for separating display device substrate-units from stacked mother substrates in an embodiment 2 of a method of manufacture of a display device according to the present invention.
Figure 4B:
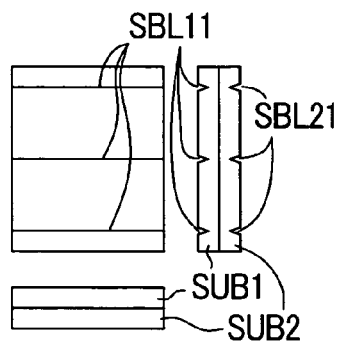
Figure 4C:
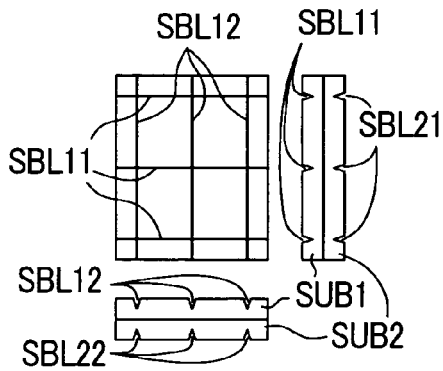
Figure 4D:
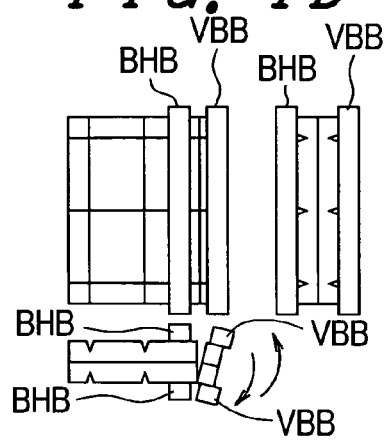
Figure 4E:
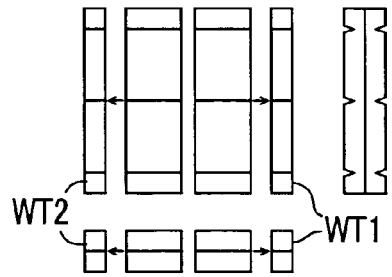
Figure 4F:
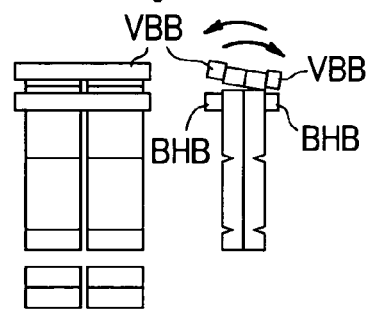
Figure 4G:
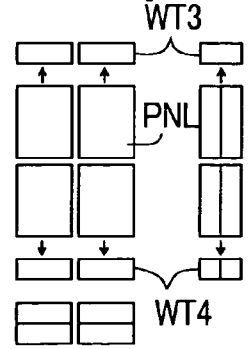
Figure 5A:
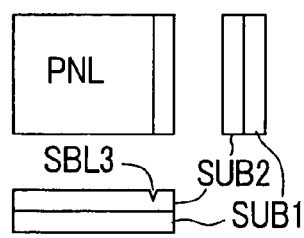
FIGS. 5A to 5G are diagrams which show steps for separating unnecessary portions (wastage) from the display device substrate-units of the embodiment 2 of the method of manufacture of the display device according to the present invention.
Figure 5B:
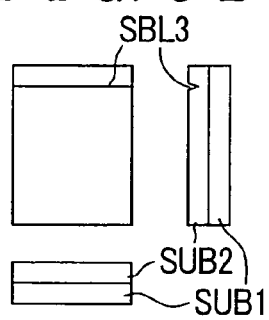
Figure 5C:
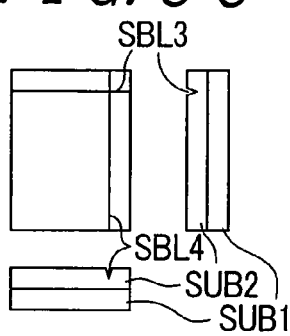
Figure 5D:
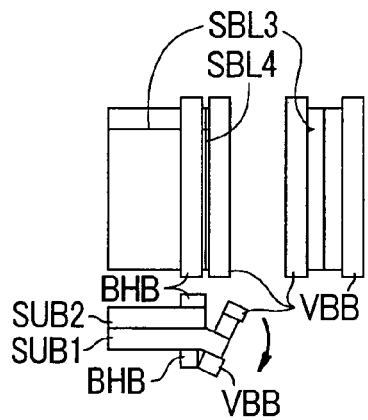
Figure 5E:
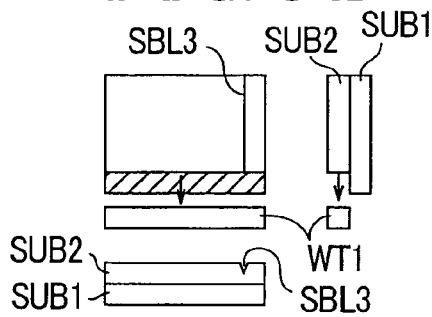
Figure 5F:
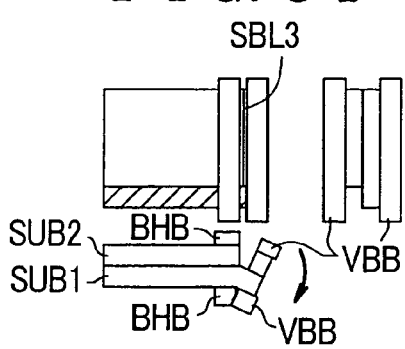
Figure 5G:
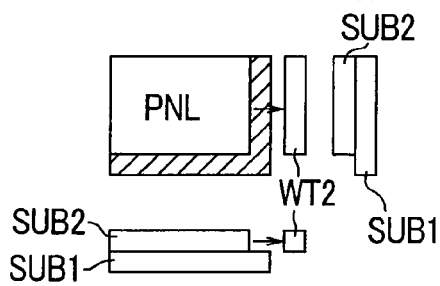

The operation peculiar to the scribing and breaking device shown in FIG. 3A appears in steps shown in FIG. 3D and FIG. 3E which succeed the step shown in FIG. 3C. Out of the second holding members BB1, BB2 which are rotated in the clockwise direction by $(\pi-\theta 1)$ in the step shown in FIG. 3C, one holding member BB1 which is brought into contact with the first substrate SUB1 is, as shown in FIG. 3D, rotated in the clockwise direction about another end (right end) of a surface which opposingly faces the first substrate SUB1. To the contrary, another holding member BB2 which is brought into contact with the second substrate SUB2 is rotated in the counter clockwise direction about one end (left end on a surface which opposingly faces the second substrate SUB2) which is brought into contact with the second substrate SUB2, and returns to the position shown in FIG. 3B. Accordingly, the second substrate SUB2 which is deflected in the y axis direction in the step shown in FIG. 3C is pushed by the second holding member BB2 such that an angle $\theta 1$ which is made between the side A and the side B returns to $\pi$ (180°).

On the other hand, the side B of the first substrate SUB1 shown in FIG. 3D, is separated from the side A and is formed into the wastage WT1 due to the breaking step shown in FIG. 3C. In the pre-stage step which produces the stacked mother substrates PN, a material having adhesiveness such as a sealing agent or flit glass which laminates the first substrate SUB1 and the second substrates SUB2 is supplied to the main surface of the first substrate SUB1 while avoiding the region which becomes the wastage WT, there exists a possibility that the adhesive material projects also to a region which constitutes the wastage WT in an actual operation. Further, static electricity which is generated in the first substrate SUB1 by the scribing step may impede the peeling off of the wastage WT1 from the workpiece. In this embodiment, as shown in FIG. 3D, the second holding member BB1 which is brought into contact with the first substrate SUB1 (side B which is formed into the wastage WT1) is rotated to be inclined with respect to the main surface of the second substrate SUB2 and, at the same time, the second substrate SUB2 (the side B which is brought into contact with the wastage WT1) is pushed toward the first substrate SUB1 using the second holding member BB2, whereby it is possible to make the wastage WT1 float from the contact surface with the workpiece, wherein the wastage WT1 is difficult to peel off from the workpiece (display device substrate-unit PNL) even when the wastage WT1 is cut out from the first substrate SUB1 (side A). With respect to the workpiece which is raised in the direction of gravity, as soon as the wastage WT1 is floated from the contact surface with the first substrate SUB1 (side A) and the second substrate SUB2 due to the rotation of the second holding member BB1, the workpiece falls in the direction of gravity. Accordingly, drawbacks attributed to the internal wastage WTM in the prior art which has been explained in conjunction with FIG. 13 can be also surely overcome.

When the removal step of the wastage WT1 shown in FIG. 3D is finished, the first holding members HB1, HB2 and the second holding members BB1, BB2 return, as shown in FIG. 3E to respective standby positions (indicated by dotted lines in FIG. 3A). When it is still necessary to cut out the wastage from another side of the workpiece (display device substrate-unit PNL), a stage STG of a substrate rotating machine ROT is brought into contact with the main surface (main surface of the second substrate SUB2) and the workpiece is rotated within the main surface (x-z plane).

The scribing and breaking device shown in FIG. 3A is, compared to the scribing and breaking device shown in FIG. 2A, characterized in that the center of rotational motion of the second holding member BB1 on the plane which intersects the main surface of the workpiece and is arranged along the transport direction of the workpiece can be changed. This scribing and breaking device can be used also in the division of the stacked mother substrates PN and the separation of the display device substrate-units PNL from the (broken) stacked mother substrates.

Embodiment 2

The embodiment 1 was specifically directed to the method of manufacture of the display device according to the present invention in which the scribing step and the breaking step of the stacked mother substrates PN are performed in a state in which the stacked mother substrates PN are held in a shift-free and inversion-less mode and in a state that the stacked mother substrates PN is broken by bending.

The embodiment 2 is directed to a manufacturing method which shifts stacked mother substrates PN between a scribing step and a breaking step. This embodiment 2 will be described hereinafter in conjunction with FIGS. 4A to 4G and 5A to 5G. In this embodiment also, in the same manner as the embodiment 1, the stacked mother substrates PN and display device substrate-units obtained by breaking the stacked mother substrates PN are transported and processed in such a state that the stacked mother substrates PN and the display device substrate-units are raised along the direction of gravity. Further, the breaking step which clamps the both sides of the portion of a main surface of a workpiece (substrates) on which a scribe line (groove) is formed using bar-like holding members and bends the workpiece by applying the rotational motion to one side of the portion within a surface which intersects the main surface of the substrate is substantially common with the breaking step described in the embodiment 1.

FIGS. 4A to 4G are diagrams which show the operation in which the stacked mother substrates are separated into individual display device substrate-units in the embodiment 2. Here, to simplify the explanation, the stacked mother substrates having four (2×2) display device substrate-units will be taken as an example.

(a) First of all, at short-side scribe positions, scribe lines SBL11 and SBL21 extending in the short-side direction are simultaneously formed on both surfaces of a first substrate SUB1 and a second substrate SUB2.

(b) After forming the whole scribe lines extending in the short side direction, the stacked mother substrates PN are rotated by 90° within the surface and are transported to a long-side scribe position.

(c) The scribe lines SBL12 and the SBL22 extending in the long-side direction are simultaneously formed on both surfaces of the first substrate SUB1 and the second substrate SUB2.

The stacked mother substrates PN on which the scribe lines SBL12 and the SBL22 extending in the long-side direction are simultaneously formed are transported to the long-side breaking position.

(d) At the long-side breaking position, portions of the stacked mother substrates PN arranged at both sides of the peripheral scribe line are clamped using holding bars BHB and bending breaking bars VBB. The holding bars BHB fix the stacked mother substrates PN and an angle of the bending breaking bars VBB is changed in the direction toward front and back surfaces of the substrates as indicated by arrows thus breaking a peripheral wastage.

(e) Next, portions of the stacked mother substrate PN arranged at both sides of another scribe line extending in the long-side direction are clamped by the holding bars BHB and the bending breaking bars VBB, the stacked mother substrates PN are fixed by the holding bars BHB and an angle of the bending breaking bars VBB is changed in the same manner thus breaking the substrates for every two strips of display device substrate-units. The peripheral wastages WT1, WT2 are thrown away. After breaking of the substrates along the whole scribe lines in the long side direction is completed, the substrates are transported to the short-side breaking position.

(f) In the short-side breaking position, peripheral wastages are broken in the same manner as the above-mentioned long side breaks and, thereafter, the display device substrate-units are collectively broken for every two strips in the short side direction.

(g) The stacked mother substrates PN are separated into the individual display device substrate-units. The peripheral wastages WT3, WT4 are thrown away. After being separated into the display device substrate-units, the display device substrate-units are transported to the display device substrate-unit intermediate wastage break position. Here, when the substrates are separated into the display device substrate-units, the removed portions of the second substrates SUB 2 do not constitute intermediate wastages. However, to make the correspondence between the present invention and the prior art clear, these portions are referred to as the intermediate wastages.

FIGS. 5A to 5G are diagrams which show the operation in which the intermediate wastages are separated from the display device substrate-units which are separated by the process shown in FIGS. 4A to 4G. The intermediate wastage portions are the peripheral portions close to the second substrate SUB2 shown in FIG. 1B.

(a) In FIG. 5, a scribe line SBL3 is formed on one of short sides of the second substrate SUB2 of the display device substrate-unit PNL.

(b) The display device substrate-unit PNL having the scribe line SBL3 formed thereon is rotated by 90° within the plane.

(c) A scribe line SBL4 is formed on one of the long sides of the second substrate SUB2. The display device substrate-unit PNL having whole scribe lines formed thereon are transported to a breaking position.

(d) In the breaking position, portions of the display device substrate-unit PNL arranged at both sides of the scribe line SLB4 are clamped by the holding bars BHB and the bending breaking bars VBB. The holding bars BHB fix the stacked mother substrates PN and an angle of the bending breaking bars VBB is changed in the direction toward front and back surfaces of the substrates as indicated by arrows thus breaking intermediate wastage WT1 at the long side of the second substrate SUB2.

(e) The display device substrate-units PNL having the intermediate wastage WT1 at the long side broken is rotated by 90° in plane. The intermediate wastage WT1 is thrown away.

(f) Next, the intermediate wastage at a short side is broken in the same manner as described above, and (g) the intermediate wastage WT2 is removed and is thrown away.

Due to the processing described above, by accomplishing the respective steps of scribing and breaking in a state that the stacked mother substrates PN and the display device substrate-units PNL are raised along the vertical direction, the core removal of the internal wastages in the prior art becomes unnecessary and hence, all of the wastages can be processed as end face wastages.

Therefore, the occurrence of cracks on the large-sized stacked mother substrates attributed to the removal of long wastages and leaking of liquid crystal attributed to the cracks can be reduced and, at the same time, the occurrence of cracks attributed to the small number of the formed scribe lines can be reduced. Further, separation portions can be surely determined and hence, the acquisition of the large number of display device substrate-units using the large-sized stacked mother substrates can be realized with a good yield rate.

Embodiment 3

In this embodiment, one example of a transportation method and transportation devices for a workpiece which is used in a manufacturing method and a manufacturing device according to the present invention will be specifically described.

Figure 6:
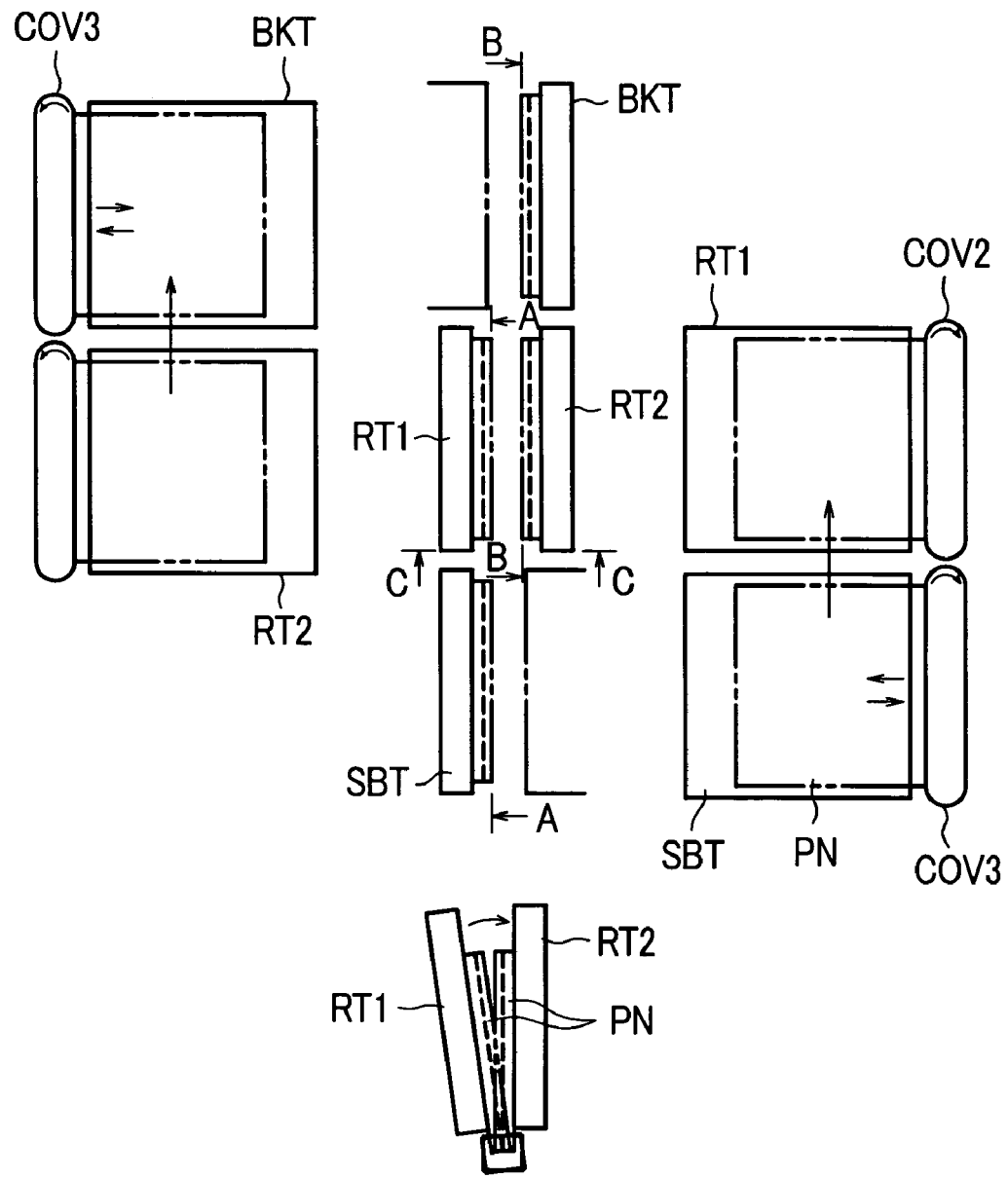
FIG. 6 is a diagram showing the transfer of a workpiece (stacked mother substrates) and an operation of inversion of a forming surface in an embodiment 3 of a method of manufacture of a display device according to the present invention.

FIG. 6 is an explanatory view of the substrate transportation and the inverting operation of a working surface of a manufacturing device according to the present invention which separates the stacked mother substrates into the display device substrate-units by forming scribe lines on the stacked mother substrates and by breaking the stacked mother substrates. In FIG. 6, a scribe table SBT of a scribe forming machine which performs forming of scribe lines, an inverting table RT1 which performs the inversion (changing of an inclined angle) of a working surface of the substrate, a breaking table BKT of a break forming machine and an inverse reception table RT2 which performs reception of substrates when the working surface is inverted face each other with the vertical direction sandwiched therebetween and in the vicinity of the vertical direction (an angle inclined by 5 to 10° to the opposite side with respect to the vertical direction). At the time of performing the operation, the scribe table SBT, the inverse table RT1, the inverse reception table RT2, the break table BKT are arranged in this order of the scribe table SBT, the inverse table RT1, the inverse reception table RT2, the break table BKT from the upper stream side.

At lower sides of respective tables, belt conveyers having an inclination substantially equal to the inclination of the respective table surfaces are provided for transporting the stacked mother substrates PN after the scribe lines are formed on the stacked mother substrates PN. Under the scribe table SBT and the break table BKT, the belt conveyers COV1, COV3 including an elevating mechanism for elevating the belt conveyers per se are arranged. Further, under the inverse table RT1 and the inverse reception table RT2, the belt conveyer COV2 which changes an angle thereof at an inclination angle in synchronism with the inverse table RT1 is arranged. Each table is provided with suction holes which suck air to hold the substrate and blow off air to peel off the substrate and, further, a vacuum suction blow mechanism which is not shown in the drawing is arranged on each table.

The stacked mother substrates PN are held by suction to the scribe table SBT in a state that the stacked mother substrates PN are raised in the vicinity of the vertical direction. From this state, the belt conveyer COV1 is elevated and is brought into contact with the lower end of the stacked mother substrates PN. Next, the belt conveyer COV1 is lowered while making extremely weak air blow from the suction holes formed in the scribe table SBT so as to transfer the stacked mother substrates PN to the belt conveyer COV1. In this state, the belt conveyer COV1 and the belt conveyer COV2 are advanced and, at the same time, extremely weak air is blown off from the suction holes formed in the scribe table SBT and the inverse table RT1 and hence, the substrates PN are transported in a floating state from the respective tables and are transferred to the inverse table RT1 side.

Next, after the substrates PN are sucked to the inverse table RT1, the inclination angle of the inverse table RT1 is changed to a value approximately equal to the inclination angle at the inverse reception table RT2 side in synchronism with the belt conveyer COV2. Then, from this state, the working surface of the substrates PN is turned over by releasing the suction of the inverse table RT1 and, at the same time, the substrates PN are transferred to the inverse reception table RT2 side. Next, the belt conveyer COV2 and the belt conveyer COV3 are advanced and, at the same time, extremely weak air is blown off from the suction holes formed in the inverse reception table RT2, the break table BKT and, the substrates PN are transported in a state being floated from the respective tables and transferred to the belt conveyer COV3 side. Further, after the transfer of the substrates PN is completed, the inclination angles of the belt conveyer COV2 and the inverse table RT1 are returned to the original state.

Next, while making an extremely weak air blow off from the suction hole of the break table BKT, the belt conveyer COV3 is elevated and, after the elevation of the belt conveyer COV3 is completed, the substrates PN are held by suction to the break table BKT and are transferred. The belt conveyer COV3 is lowered to the original position after the suction is completed.

Here, in FIG. 6, it may be possible that the substrate transportation using the belt conveyers, for example, is replaced by a shuttle method, or the scribe table SBT is directly advanced, changes an angle thereof and is transferred to the break table without using the inverse table or the inverse reception table.

Due to this embodiment, the occurrence of cracks or the occurrence of local gap irregularities at the transfer and transportation of the substrates between respective positions of scribing and breaking can be obviated and a high quality display device with a good yield rate can be obtained.

Embodiment 4

Figure 7:
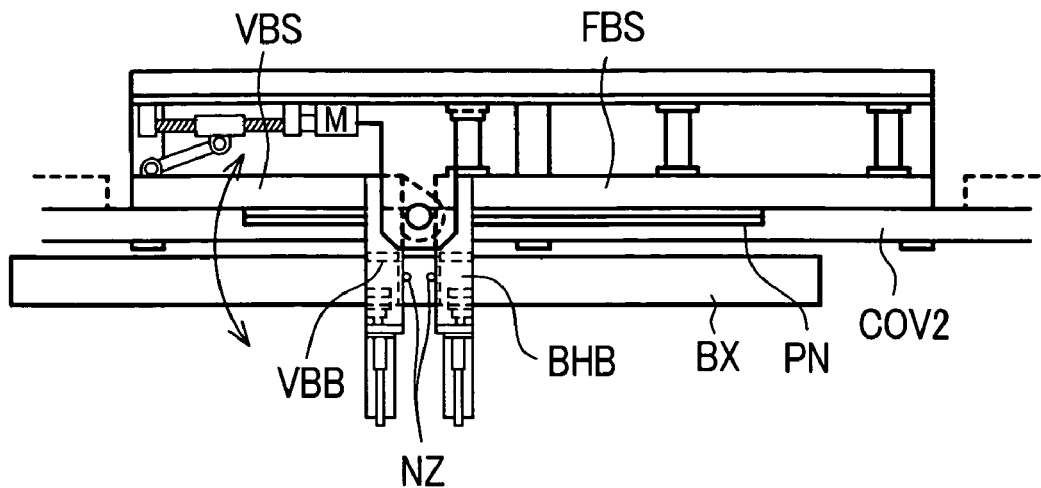
FIG. 7 is a diagram showing an upper surface of a substrate break separation device in a device for manufacture of the display device according to the present invention.
Figure 8:
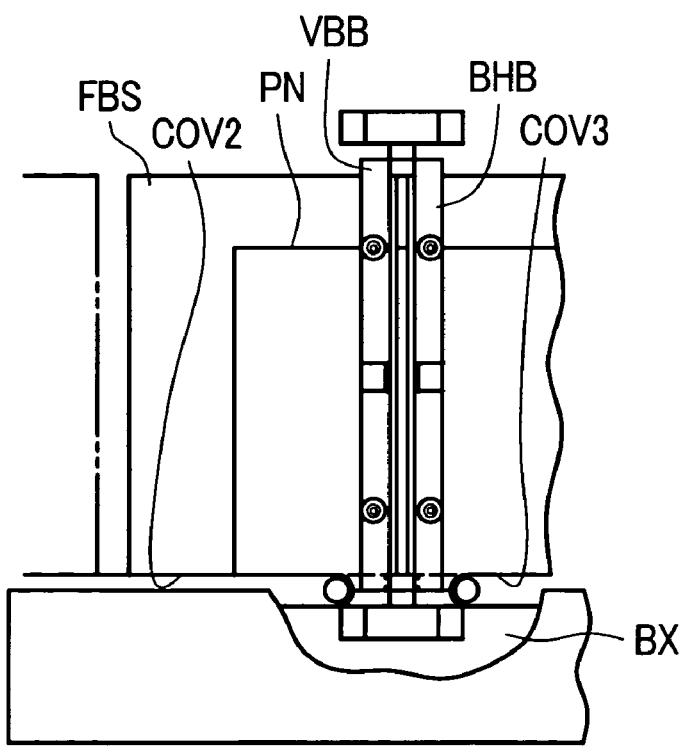
FIG. 8 is a diagram showing a front portion of a representative part of the substrate break separation device in the device for manufacture of the display device according to the present invention.
Figure 9:
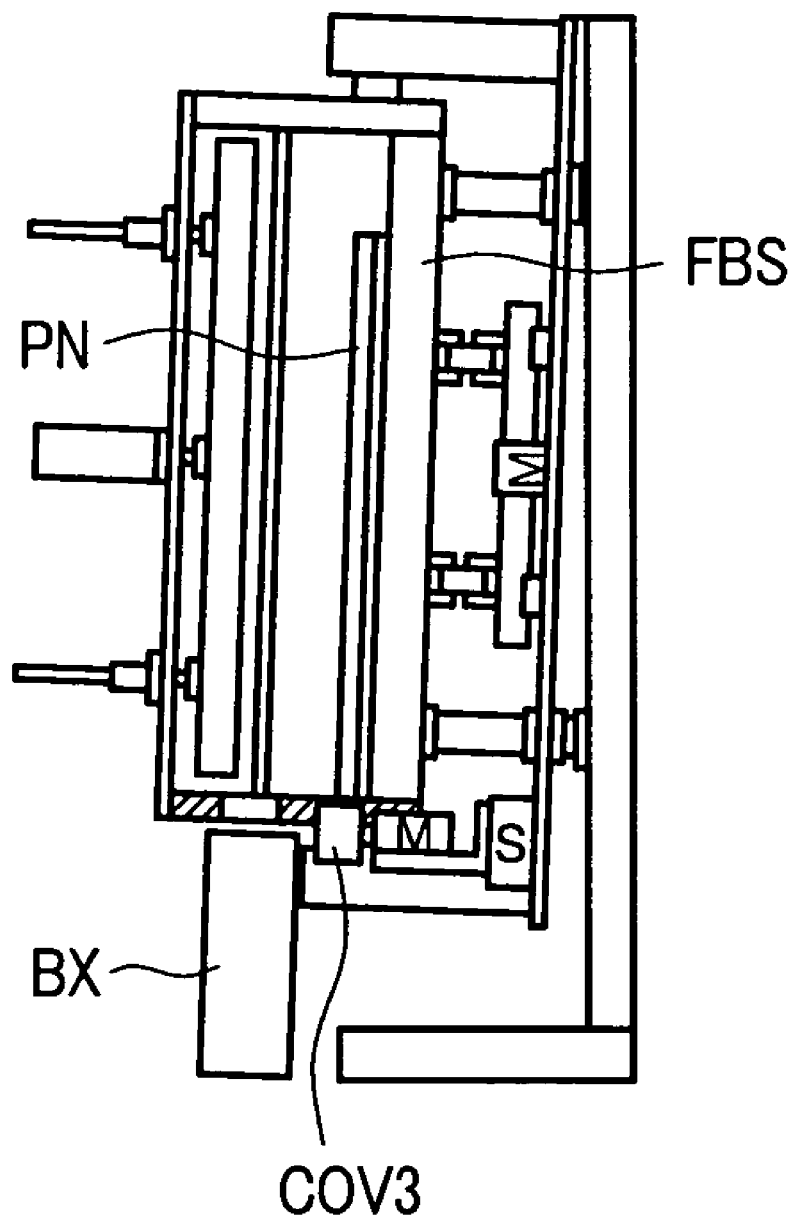
FIG. 9 is a diagram showing a side surface of a representative part of the substrate break separation device in the device for manufacture of the display device according to the present invention.
Figure 10A:
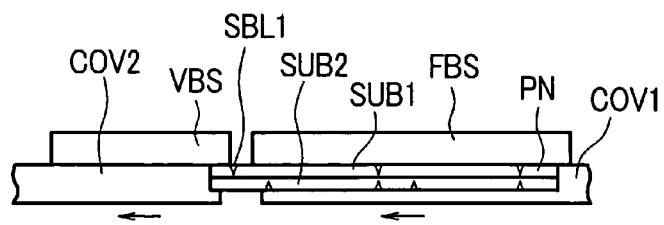
FIGS. 10A to 10F are diagrams which show steps in a substrate break separation process in the device for manufacture of the display device shown in FIG. 7 to FIG. 9.
Figure 10B:
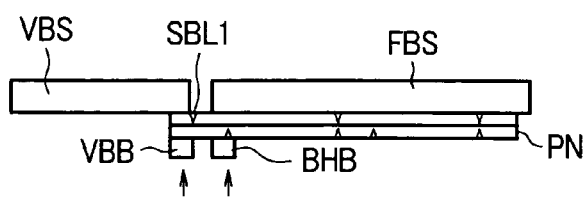
Figure 10C:
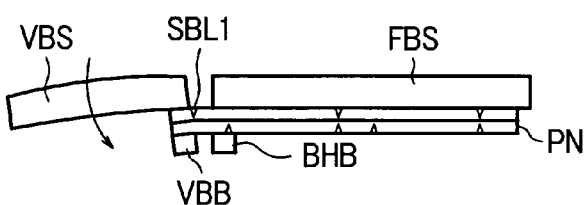
Figure 10D:
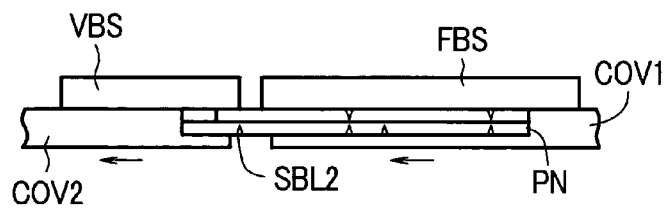
Figure 10E:
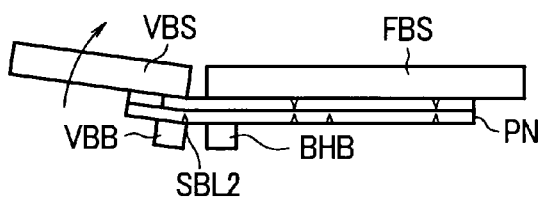
Figure 10F:
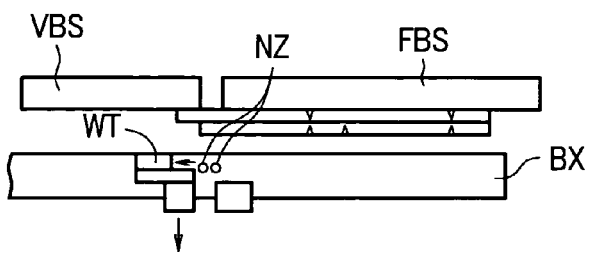

FIG. 7 to FIG. 9 are diagrams of a substrate breaking and separating device in the manufacturing device of a display device according to the present invention. In these drawings, FIG. 7 is a top plan view, FIG. 8 is a front view of a representative part, and FIG. 9 is a side view of a representative part. In FIG. 7 to FIG. 9, the stacked mother substrates PN are, after the formation of the scribe lines is completed, transported from an upstream side by belt conveyers and, then, is transferred to a breaking working machine. By driving and stopping belt conveyers COV2, COV3, the substrates PN are moved to an arbitrary separating position. The substrates PN which are broken and are separated are transported to a downstream side by the belt conveyer COV. At the time of transporting the substrates, the substrates are inclined with an inclination angle of 5 to 10° in the vertical direction to prevent the substrates from falling and, at the same time, air is blown off from suction holes formed in a fixed-side surface table FBS and an angle-changing-side surface table VBS to transport the substrates in a state that the substrates are floated thus preventing the collapsing of the substrate surface.

Further, at the time of breaking and separating the substrates, fixed-side substrate holding bars BHB, angle-changing-side substrate holding bars VBB are advanced and, in a state that the substrates are sandwiched between the fixed-side surface table FBS and the angle-changing-side surface table VBS respectively, the belt conveyers COV1, COV2 are lowered and retracted. Further, the angle-changing-side surface table VBS is bent for respective angle-changing-side substrate holding bars VBB so as to break the substrates in the direction which applies a tensile strength to the scribe line. Further, wastage which is generated in this breaking operation is thrown away into a wastage housing box BX in such a manner that the respective substrate holding bars are retracted in a state that the wastages are sucked to the respective substrate holding bars and the suction of the respective bars is released while blowing off air toward the wastage housing box BX using an air blow nozzle NZ.

FIGS. 10A to 10F are diagrams which show the substrate breaking and separating process by the manufacturing device shown in FIG. 7 to FIG. 9. As described above, (a) By driving the belt conveyer COV1 and the belt conveyer COV2, the stacked mother substrates PN are transported to a first scribe line SBL1 position.

(b) In a state that the substrates are clamped between the fixed-side substrate holding bar BHB and the angle-changing-side surface table VBS, the belt conveyers COV1, COV2 are lowered and retracted.

(c) In the direction which applies the tensile strength along the scribe line SBL1, the angle-changing-side surface table VBS is bent together with the angle-changing-side substrate holding bar VBB and thus breaking the stacked mother substrates PN.

(d) By driving the belt conveyer COV1 and the belt conveyer COV2 again, the stacked mother substrates PN are transported to a second scribe line SBL2 position.

(e) The above-mentioned operations (b), (c) are repeated and the substrates PN are broken along the second scribe line SBL2.

(f) While holding wastages WT by suction with the angle-changing-side substrate holding bars VBB, the angle-changing-side substrate holding bar VBB is retracted and, thereafter, the wastages are thrown away into the wastage housing box BX by releasing the suction while performing the air blow. By repeating the above-mentioned steps for each scribe line, the stacked mother substrates are broken.

Embodiment 5

Figure 11B:
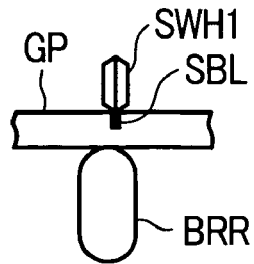
FIGS. 11A and 11B are diagrams showing a method of a display device according to the present invention.
Figure 11A:
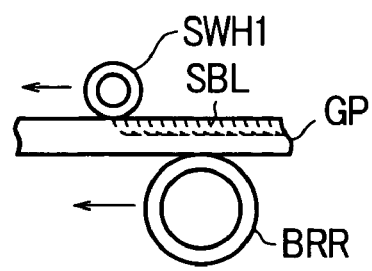
Figure 12:
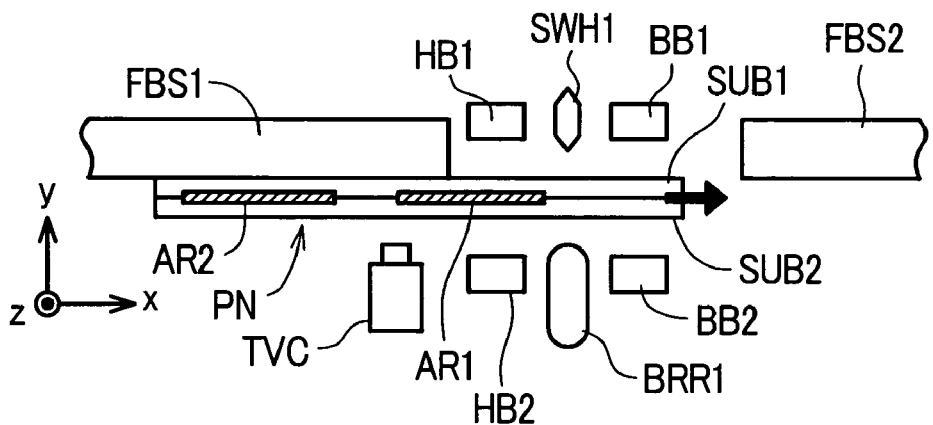
FIG. 12 is a diagram corresponding to FIG. 2A in the device for manufacture of the display device according to the present invention.

FIG. 11A, FIG. 11B and FIG. 12 are diagrams illustrating another embodiment of a manufacturing method and a manufacturing device according to the present invention. In the drawings, FIGS. 11A and 11B are diagrams relating to the manufacturing method, and FIG. 12 is a diagram relating to the manufacturing device and corresponds to FIG. 2B.

In this embodiment, at positions which face each other while sandwiching a workpiece therebetween, a scribe wheel and a break roller for promoting the cleaving of a scribe line which is formed using the scribe wheel by expanding the scribe line from a side opposite to a side on which the scribe line is formed by pushing are arranged. Then, by moving the scribe wheel and the break roller substantially simultaneously or in such a manner that the break roller follows the scribe wheel in the direction that the above-mentioned workpiece surface is to be separated, it is possible to separate the workpiece by one step.

FIG. 11A and FIG. 11B are diagrams which show the manufacturing method, wherein FIG. 11A is a front view and FIG. 11B is a side view.

In this embodiment, one surface of a glass plate GP which constitutes a workpiece is scribed by moving the scribe wheel SWH1 in the direction shown by arrows, and, hence, a scribe line SBL is formed.

On the other hand, the break roller BRR which is arranged at another surface side while sandwiching the glass plate GP which constitutes the workpiece together with the scribe wheel SWH1 is brought into a pressure contact with another surface of the glass plate GP. Holding this pressure contact state, the break roller BRR is made to advance in the same direction as the above-mentioned scribe wheel SWH1 substantially simultaneously with the scribe wheel SWH1 or following the scribe wheel SWH1 with a slight delay as shown in the drawing and the cleaving of the above-mentioned scribe line SBL is promoted and is broken thus separating the above-mentioned workpiece by the above-mentioned scribe line SBL.

FIG. 12 is a diagram showing one example of a manufacturing device according to the present invention which incorporates the break roller BRR in the inside of the device and corresponds to the above-mentioned FIG. 2A.

In FIG. 12, the break roller BRR1 which promotes the cleaving of the scribe line SBL is arranged at a side opposite to the scribe wheel SWH1 which forms scribe lines on the main surface of the first substrate SUB1 of the stacked mother substrates PN and, at the same time, between a first holding member HB2 which sandwiches the stacked mother substrates PN from both sides thereof together with a first holding member HB1 and a second holding member BB2 which sandwiches the stacked mother substrates PN from both sides thereof together with a second holding member BB1 in the same manner as the first holding member HB2.

The break roller BRR1 is operated in a state that the scribe wheel SWH1 scribes the stacked mother substrates PN, that is, the break roller BRR1 is operated in a state that the stacked mother substrates PN is clamped and fixed between the first holding members HB1, HB2 as well as between the second holding members BB1, BB2 and hence, the scribe line formed on the main surface of the first substrate SUB1 is sequentially pushed from the main surface side of the second substrate SUB1 whereby the cleaving of the above-mentioned scribe line is enhanced.

According to this embodiment, it is possible to separate the workpiece such as the staked mother substrate PN by a single step without inverting and moving the workpiece for each step.

Embodiment 6

Figure 13:
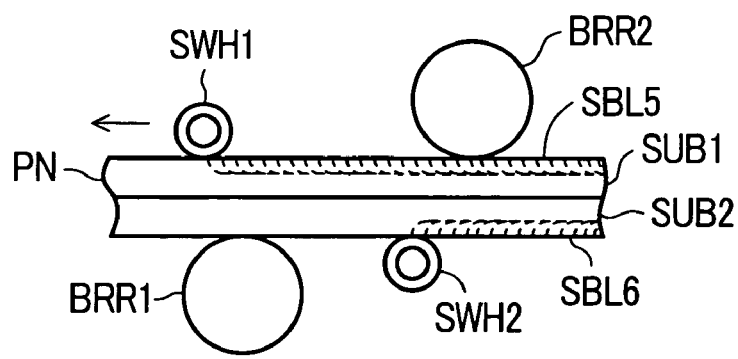
FIG. 13 is a diagram showing another embodiment of the manufacturing method and the manufacturing device according to the present invention.

FIG. 13 is a diagram showing another embodiment of a manufacturing method and a manufacturing device according to the present invention.

This embodiment provides a method and a device which are suitable for separating a workpiece having the laminated structure constituted of the first and second substrates such as the above-mentioned stacked mother substrates PN and is characterized in that both substrates can be broken simultaneously.

In FIG. 13, the manufacturing device includes a first scribe wheel SWH1 which forms a scribe line SBL5 on a main surface of the first substrate SUB1 of the stacked mother substrates PN, a first break roller BRR1 which is arranged on a side opposite to the first scribe wheel SWH1 while sandwiching the above-mentioned stacked mother substrates PN therebetween and promotes the cleaving of the scribe line SBL5 which is formed on the main surface of the first substrate SUB1, a second scribe wheel SWH2 which forms a scribe line SBL6 on a main surface of the second substrate SUB2 and a second break roller BRR2 which is arranged on a side opposite to the second scribe wheel SWH2 while sandwiching the stacked mother substrates PN therebetween and promotes the cleaving of the scribe line SBL6 which is formed on the main surface of the second substrate SUB2. Due to such a constitution, it is possible to separate the first and the second substrates of the stacked mother substrates PN simultaneously.

In this embodiment, it is possible to separate the workpiece such as the stacked mother substrates PN without inverting and moving the workpiece for every step and, at the same time, it is possible to break both main surfaces of the stacked mother substrates PN simultaneously.

Embodiment 7

Figure 14A:
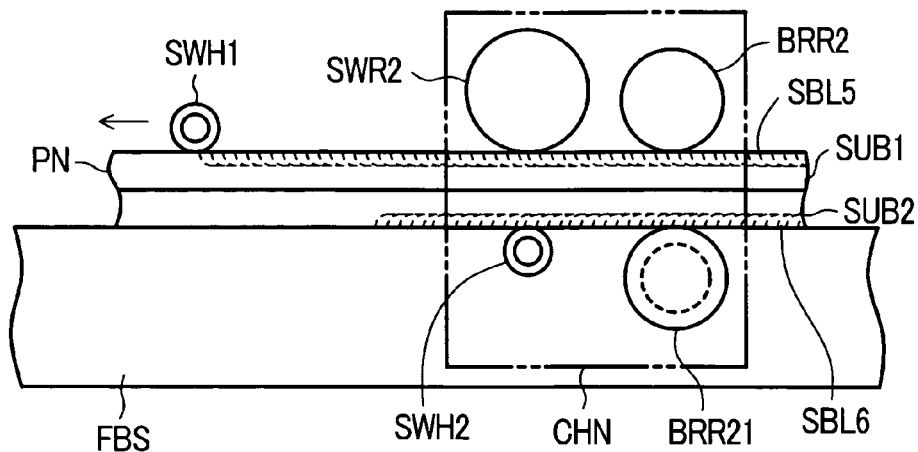
Figure 14B:
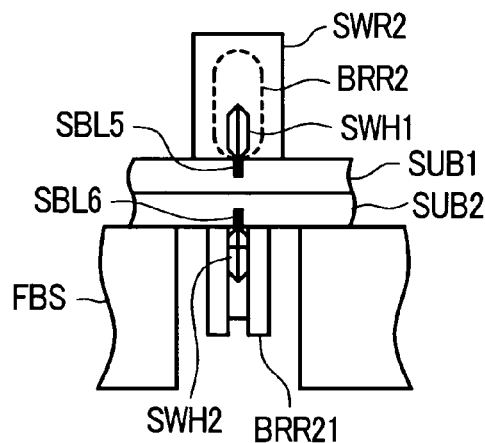
Figure 15:
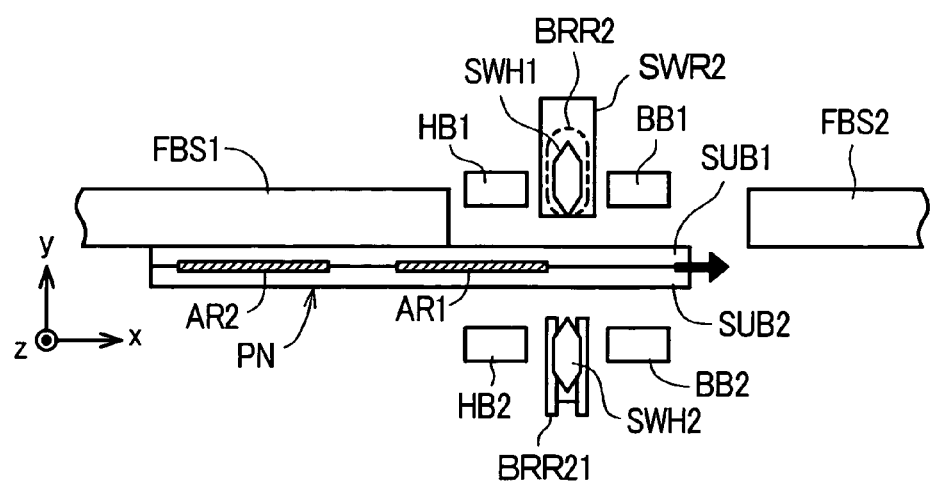
FIG. 15 is a diagram corresponding to FIG. 12 showing the device for manufacture of a display device according to the present invention.

FIG. 14A, FIG. 14B and FIG. 15 are diagrams showing another embodiment of a manufacturing method and a manufacturing device according to the present invention. In the drawings, FIG. 14A and FIG. 14B are views relating to the manufacturing method, wherein FIG. 14A is a front view, FIG. 14B is a side view and FIG. 15 relates to the manufacturing device and corresponds to FIG. 12.

This embodiment is directed to a further improvement of the embodiment shown in FIG. 13 in which the operability at the time of performing the scribing operation can be enhanced.

In this embodiment, while a scribe wheel SWH1 for forming a scribe line SBL5 is arranged on a main surface of a first substrate SUB1, a scribe wheel SWH2 for forming a scribe line SBL6 is arranged on a main surface of a second substrate SUB2 and a scribe assist roller SWR2 is arranged on the main surface side of the substrate SUB1 to face the scribe wheel SWH2 in an opposing manner. Further, a break assist roller BRR21 is arranged on a main surface side of the first substrate SUB1 at a position where the break assist roller BRR21 faces the break roller BRR in an opposing manner. The break roller BRR2 and the break assist roller BRR21 are arranged coaxially.

Here, the reference symbol CHU indicates a substrate breaking unit and has a constitution having a range surrounded by a dotted double-dashed line. In this embodiment, the substrate breaking unit is a substrate breaking unit of the second substrate SUB2.

Further, in this embodiment, the scribe assist roller SWR2 is a flat roller and this scribe assist roller SWR2 functions as a reaction force suppressor at the time of scribing using the scribe wheel SWH2.

On the other hand, a concave roller is used as the break assist roller BRR21, wherein the break assist roller BRR21 promotes the progress of cleaving of the scribe line SBL6 in a cooperative manner with the break roller BRR2 formed of a convex roller in a pair.

Although the break roller BRR2 and the break assist roller BRR21 are arranged coaxially as described above, it is also possible to control a broken surface shape by shifting the center axes of both rollers.

In this embodiment, the cleaving depth of the scribe formed in the one-side substrate (the second substrate SUB2) can be made deeper than the cleaving depth of the scribe formed in the other side so as to enhance the reliability of breaking operation.

Embodiment 8

Figure 16A:
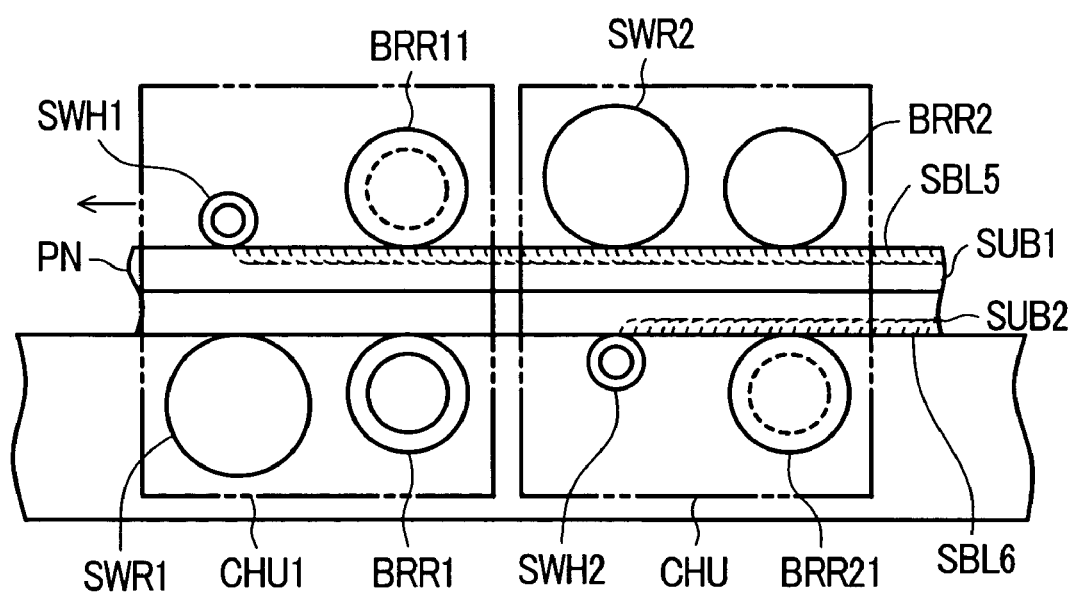
Figure 16B:
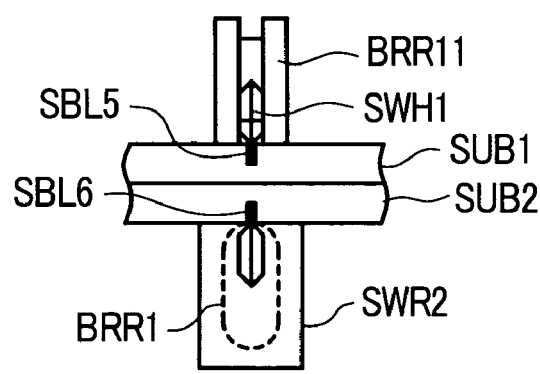

FIG. 16A and FIG. 16B are diagrams showing another embodiment of a manufacturing method and a manufacturing device according to the present invention, wherein FIG. 16A is a front view and FIG. 16B is a side view.

In this embodiment, a substrate breaking unit CHU1 which is used for the first substrate SUB1 is further added to the constitution of the above-mentioned embodiment 7.

In this embodiment, the reliability of scribing and breaking can be further enhanced.

FIGS. 17A to 17K show the breaking steps as one example of the scribe roller breaking method according to the present invention explained in the above-mentioned embodiments 5 to 8.

(a) In FIG. 17A, first of all, the stacked mother substrates PN which is formed by laminating the first substrate SUB1 and the second substrate SUB2 to each other is provided.

Here, in FIGS. 17A to 17K, the embodiment will be explained using a plan view and a side view shown below the plan view.

In FIG. 17B, scribing is performed using scribe wheels SHW1, SHW2. Along with such a scribing operation, the cleaving of the scribe lines is enhanced using the break roller so as to break the end portion of the scribe line by a breaking line BKL and the peripheral wastage WT is thrown away.

Following this step, a scribe line SBL7 is formed at a position shown in FIG. 17C on the first substrate SUB1. Simultaneously with or following this step, by applying a pressure using the breaking roller from the second substrate SUB2 side, the cleaving of the scribe line SBL7 which is formed on the first substrate SUB1 is progressed and breaking is performed. Next, in FIG. 17D, at a position away from the scribe line SBL7 by a width of an intermediate wastage WTM, the both substrates SUB1 and SUB2 are broken using a combination of the scribes and the break rollers and display device substrate-units PNL1 having a terminal portion thereof exposed and the intermediate wastage WTM are separated. On the other hand, a scribe line SBL8 is formed on the remaining portion of the first substrate SUB1 of the stacked mother substrates PN in FIG. 17E and, simultaneously with or following the step, by applying pressure using the break roller from the second substrate SUB2 side the scribe line SBL8 formed on the first substrate SUB1 is cleaved and broken. An end portion WT5 which is broken at this scribe line SBL8 and the portion of the second substrate SUB2 corresponding to the end portion WT5 are broken again by a size corresponding to a terminal portion in FIG. 17F and a display device substrate-unit PNL2 having a terminal portion thereof exposed, a peripheral wastage WT51 and a peripheral wastage WT52 are separated. Long side end portions of two display device substrate-units PNL1, 2 obtained in the step are broken at peripheral wastage WT6 portions in FIG. 17G and further are broken at peripheral wastage WT7 portion for exposing terminal portions at short sides in FIG. 17H thus obtaining the display device substrate-units PNL3, 4 having terminal portions continuously exposed at one long side and one short side respectively. Next, the display device substrate-units PNL3, 4 having end portions exposed at one long side and one short side respectively are broken at the substantial center of the long side in FIG. 17I thus obtaining a display device substrate-unit PNL5 and a display device substrate-unit PNL6 having a terminal portion formed only at the short side. It is needless to say that this breaking is also performed using a combination of the scribe and the break roller. The long side end portion of the broken display device substrate-unit PNL6 is broken in FIG. 17J thus obtaining a display device substrate-unit PNL61 having a terminal portion continuously formed at one long side and one short side. Thereafter, the long side end portion of the display device substrate-unit PNL61 having no terminal portion is broken and a peripheral wastage WT8 is thrown away thus obtaining the display device substrate-unit PNL7.

<Overall Constitution of the Manufacturing Step of the Display Device>

Figure 18:
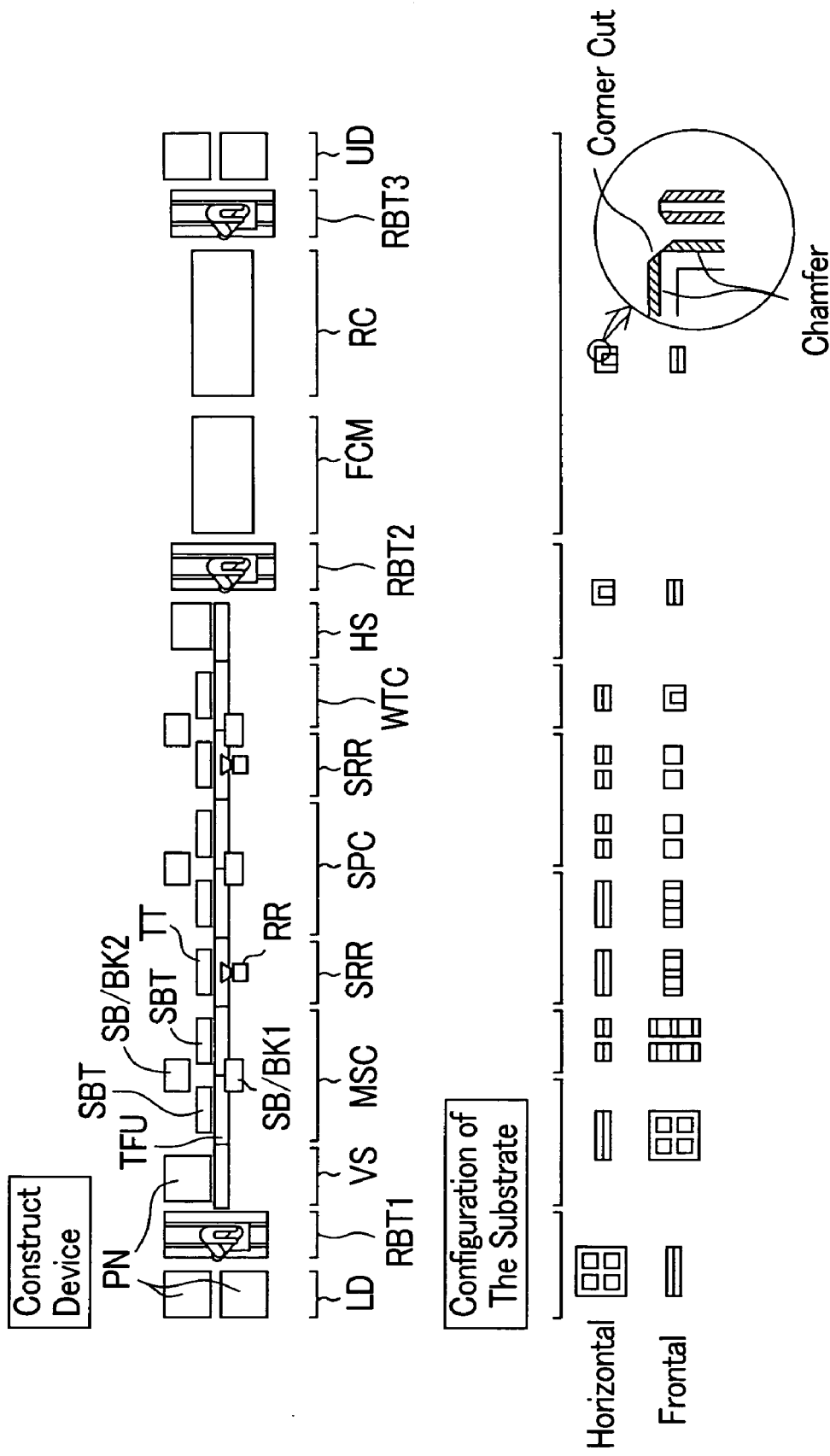
FIG. 18 is a diagram showing an overall constitutional example of the manufacturing device arranged according to the steps of manufacture of the display device according to the present invention.
Figure 19:
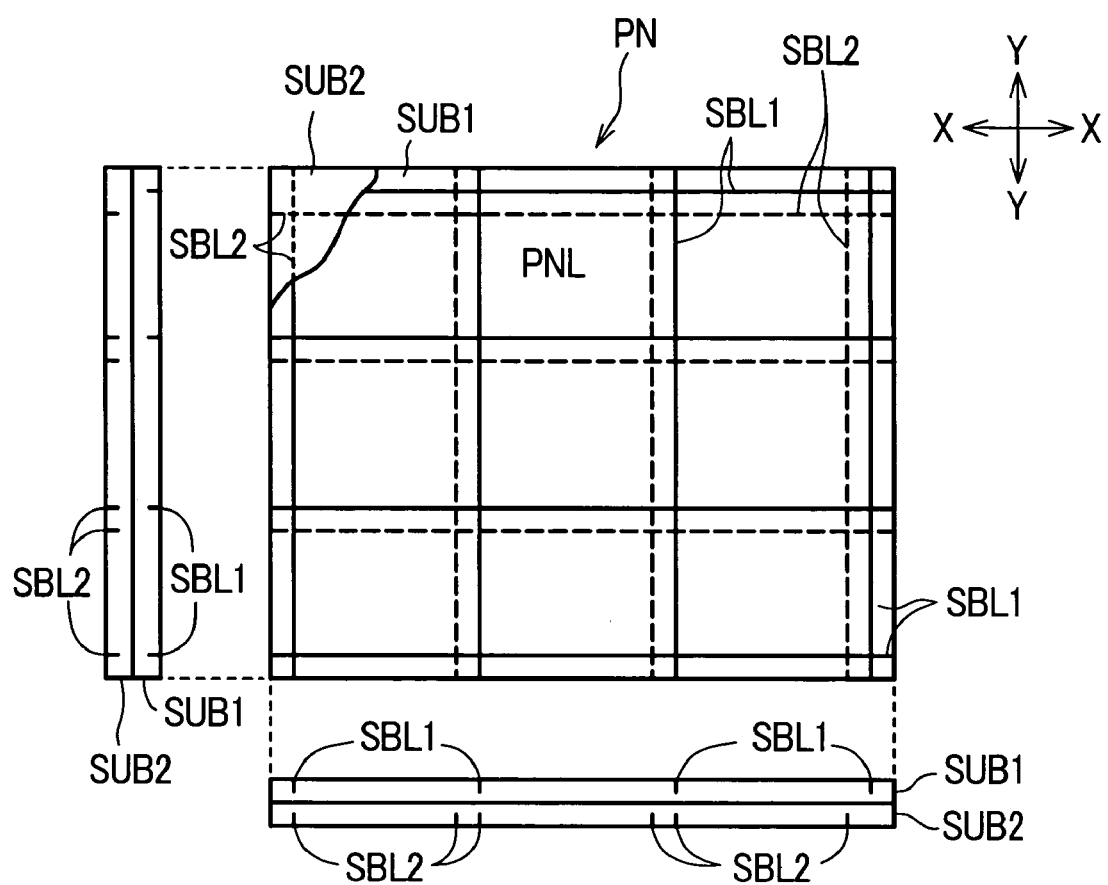
FIG. 19 is a diagram showing an example of forming scribe lines in a conventional scribing and breaking method.
Figure 20A:
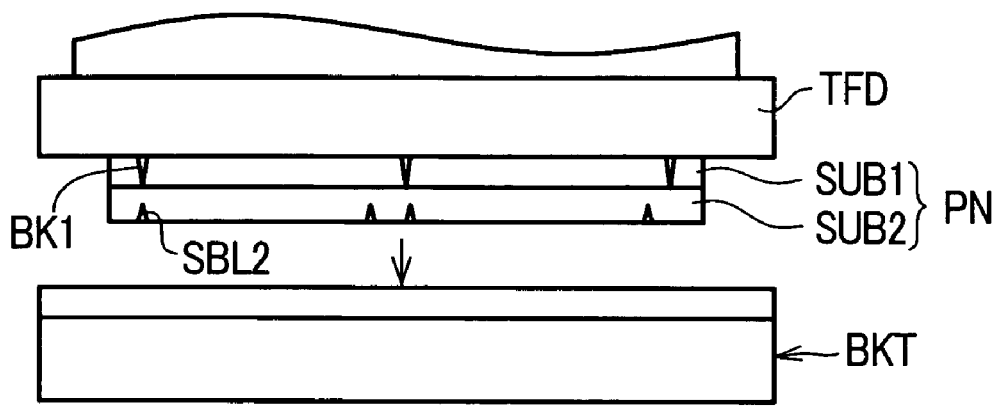
FIGS. 20A to 20C are diagrams showing the operations for separating stacked mother substrates in which scribe lines are formed into display device substrate-units by breaking.
Figure 20B:
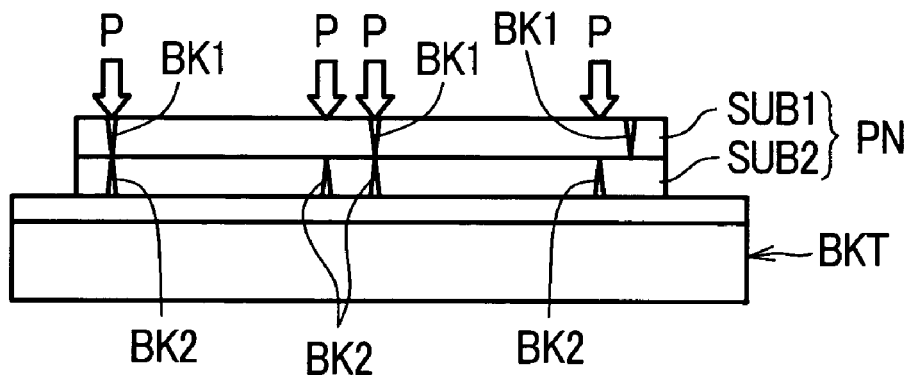
Figure 20C:
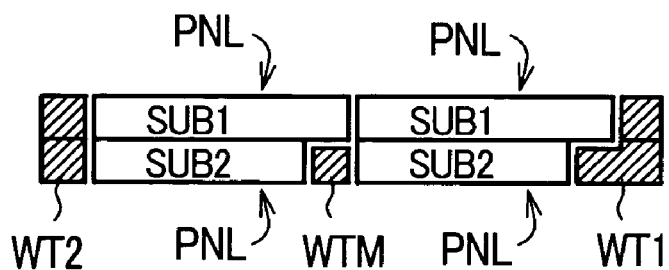
Figure 21:
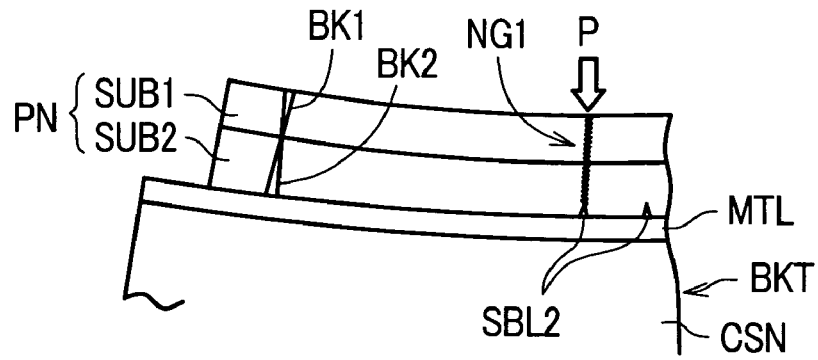
FIG. 21 is a diagram showing breaking of intermediate wastage portions in FIG. 13 in view of an example of display device substrate-units using a scribing and breaking method.
Figure 22:
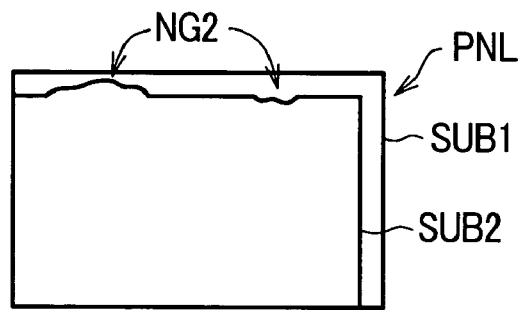
FIG. 22 is a diagrammatic plan view showing one example of an irregular break produced by a conventional scribing and breaking method.
Figure 23A:
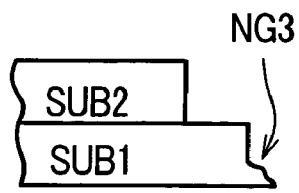
FIGS. 23A to 23C are diagrams showing examples of typical flaws which occur in the course of handling the substrate in a conventional scribing and breaking method.
Figure 23B:
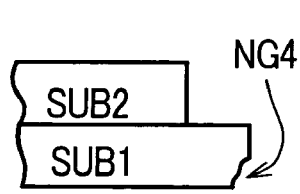
Figure 23C:
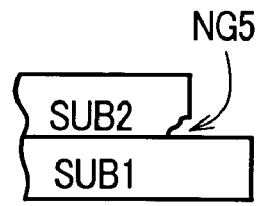
Figure 24A:
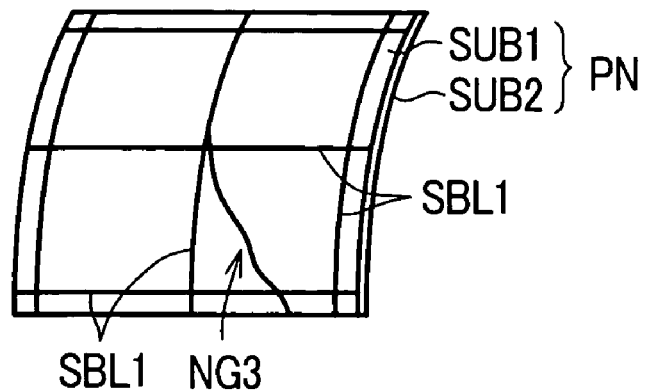
FIGS. 24A to 24C are diagrams which show examples of substrate crack which occur in stacked mother substrates in which scribe lines are formed and difficulty in removal of intermediate wastage.
Figure 24B:
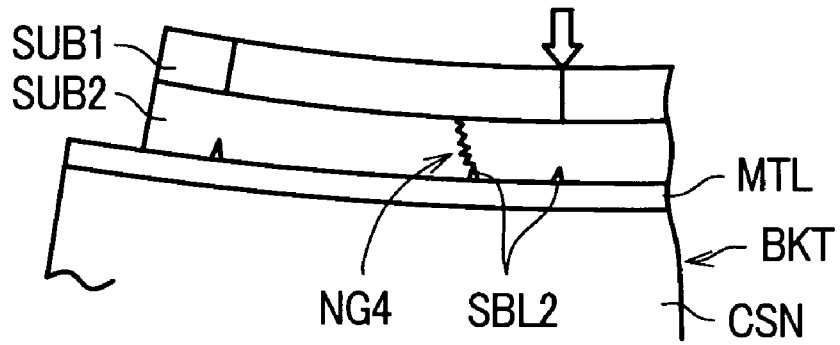
Figure 24C:
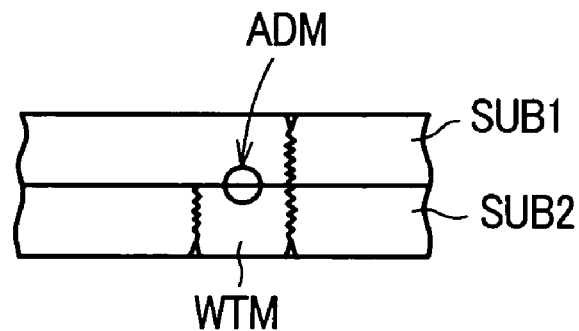

FIG. 18 is a diagram showing an example of the overall constitution of the manufacturing device arranged according to the steps of manufacture of a display device according to the present invention. An upper stage of the drawing shows the arrangement constitution of the device and a lower stage of the drawing shows the shape of substrates at respective steps. In FIG. 18, the symbol LD indicates a transported position and large-sized stacked mother substrates PN are transported using a cassette loader. The transported stacked mother substrates PN are transferred to a substrate raising machine VS by a horizontal multi-articulated robot RBT1 and are raised on the table surface of the large-sized substrate→strip-like scribe/break device MSC. Symbol TFU indicates a substrate transporting unit formed of the above-mentioned conveyers, symbol SBT indicates a surface table, symbol SB/BK1 indicates a scribing and breaking unit for the first substrate and symbol SB/BK2 indicates a scribing and breaking unit for the second substrate.

In the downstream of the large-sized substrate→strip-like scribe/break device MSC, a substrate rotating unit SPR is arranged. Symbol TT indicates a substrate rotating table, symbol RR indicates a rotating mechanism. The substrates which are broken into strips using the large-sized substrate→strip-like scribe/break device MSC are transferred to a strip→display device substrate-unit scribe/break device SPC having the substantially same constitution as the large-sized substrate→strip-like scribe/break device MSC and having a processing size corresponding to the strip-like substrates. The substrates (display device substrate-units) which are separated into the display device substrate-units using the strip→display device substrate-unit scribe/break device SPC are transferred to a scribing and breaking device for terminal portion wastages, that is, intermediate wastages WTC and the intermediate wastages are separated in the manner as described above. The intermediate wastage scribing and breaking device WTC has the constitution which performs the scribing and breaking on the second substrate only and the scribe line forming and breaking processing have constitutions which are substantially equal to the constitution of the scribing and breaking device in the upstream. The rotation of the substrates by 90° at the scribing and breaking devices MSC, SPC and WTC is performed using the substrate rotating units SRR.

Each display device substrate-unit having wastages thereof separated is transferred to a substrate horizontal posture restoring device HS and is returned to the horizontal position. The display device substrate-unit which is returned to the horizontal position is transferred to a chamfering/corner cut forming device FCM by a horizontal multi-articulated robot RBT2 and chamfering and corner cutting are performed on the display device substrate-unit as shown in the drawing. Then, after cleaned by a substrate cleaning device RC, the display device substrate-unit is housed in a substrate cassette unloader UD by a horizontal multi-articulated robot RBT3.

Here, although the explanation has been made with respect to the glass substrate of the liquid crystal display device, it is needless to say that the present invention is not limited to such a constitution and the present invention can be similarly applied to the separation of various display devices using large-sized stacked mother substrates or other stacked-layer substrates.

As has been explained heretofore, according to the present invention, it is possible to provide the manufacturing method and the manufacturing device of a display device which can largely reduce the occurrence of the cracks on the substrates compared to the constitution which scribes and breaks stacked mother substrates by turning over the stacked mother substrates in a horizontal state and, at the same time, can facilitate the wastage processing including the removal of the internal wastage, and can enhance the high quality and the high yield rate.

What is claimed is:

1. A manufacturing method of a display device comprising;

a raising step of a workpiece in which the workpiece including a first substrate and a second substrate which are laminated to each other in an opposingly facing manner and at least one display region formed between the first and the second substrates is raised such that an angle which a main surface of the workpiece makes with respect to the direction of gravity is decreased;

a first scribing step in which a first scribe line is formed on the main surface of the first substrate, a first breaking step in which the first substrate is broken along the first scribe line by bending the workpiece toward the second substrate side;

a second scribing step in which a second scribe line is formed on the main surface of the second substrate; and a second breaking step in which the second substrate is broken along the second scribe line by bending the workpiece toward the first substrate side are sequentially performed in this order, wherein a portion of the workpiece where at least one display region is formed and another portion close to the portion are separated from each other.

2. A manufacturing method of a display device according to claim 1, wherein another portion close to the portion of the workpiece where at least one display region is formed is thrown away as wastage.

3. A manufacturing method of a display device according to claim 1, wherein a separate display region is formed on another portion close to the portion of the workpiece where at least one display region is formed.

4. A manufacturing method of a display device according to claim 1, wherein after the completion of the second breaking step, either one of a series of flow consisting of the first scribing step, the first breaking step, the second scribing step and the second breaking step and a series of flow consisting of the second scribing step, the second breaking step, the first scribing step and the first breaking step is repeated.

5. A manufacturing method of a display device according to claim 4, wherein after the completion of the second breaking step, the workpiece is rotated within a main surface thereof and, thereafter, either one of the series of steps which succeed the second breaking step are started.

\* \* \* \* \*